(12) United States Patent
Marc et al.

(10) Patent No.: US 11,943,533 B2
(45) Date of Patent: Mar. 26, 2024

(54) LENS MODE AUTO-DETECTION

(71) Applicant: GoPro, Inc., San Mateo, CA (US)

(72) Inventors: Gladys Marc, Paris (FR); Marc Lebrun, Issy-les-Moulineaux (FR)

(73) Assignee: GoPro, Inc., San Mateo, CA (US)

( * ) Notice: Subject to any disclaimer, the term of this patent is extended or adjusted under 35 U.S.C. 154(b) by 100 days.

(21) Appl. No.: 17/669,139

(22) Filed: Feb. 10, 2022

(65) Prior Publication Data

US 2023/0254576 A1 Aug. 10, 2023

(51) Int. Cl.
*H04N 23/667* (2023.01)
*G03B 17/56* (2021.01)
*H04N 23/62* (2023.01)

(52) U.S. Cl.
CPC ......... *H04N 23/667* (2023.01); *G03B 17/565* (2013.01); *H04N 23/62* (2023.01)

(58) Field of Classification Search
CPC .. H04N 13/239; H04N 23/611; H04N 13/359; H04N 13/398; H04N 13/341; H04N 23/55; H04N 13/144; H04N 2213/008; H04N 13/261; H04N 13/334
See application file for complete search history.

(56) References Cited

U.S. PATENT DOCUMENTS

2010/0309364 A1* 12/2010 Brunner ................. H04N 5/772
348/E5.045

* cited by examiner

*Primary Examiner* — Samira Monshi
(74) *Attorney, Agent, or Firm* — Young Basile Hanlon & MacFarlane, P.C.

(57) ABSTRACT

Lens mode auto-detection includes obtaining predicate lens mode data, obtaining probable lens mode data, obtaining a lens mode score in accordance with the predicate lens mode data and the probable lens mode data, determining whether the lens mode score is greater than a defined lens mode change threshold, and, in response to determining that the lens mode score is greater than the defined lens mode change threshold, outputting lens mode data.

20 Claims, 8 Drawing Sheets

LENS MODE AUTO-DETECTION

TECHNICAL FIELD

This disclosure relates to digital image and video capture and processing, including lens, such as fisheye lens, auto-detection.

BACKGROUND

Image capture devices, such as cameras, may capture content as images or video. Light may be received and focused via a lens and may be converted to an electronic image signal by an image sensor. The image signal may be processed by an image signal processor to form an image, which may be stored and/or encoded.

SUMMARY

Disclosed herein are implementations of lens mode auto-detection.

An aspect of the disclosure is a method of lens mode auto-detection by an image capture apparatus. Lens mode auto-detection includes obtaining predicate lens mode data, obtaining probable lens mode data, obtaining a lens mode score in accordance with the predicate lens mode data and the probable lens mode data, determining whether the lens mode score is greater than a defined lens mode change threshold, and, in response to determining that the lens mode score is greater than the defined lens mode change threshold, outputting lens mode data.

Another aspect of the disclosure is an image capture apparatus comprising a currently operative lens, an image sensor configured to capture, using the currently operative lens, a current input image, and a processor configured to execute instructions stored in a memory of the image capture apparatus to perform lens mode auto-detection. To perform lens mode auto-detection the processor executes the instructions to obtain predicate lens mode data, obtain probable lens mode data using the current input image, obtain a lens mode score in accordance with the predicate lens mode data and the probable lens mode data, determine whether the lens mode score is greater than a defined lens mode change threshold, and, in response to a determination that the lens mode score is greater than the defined lens mode change threshold, output, for presentation to a user of the image capture apparatus, lens mode data indicating that the currently operative lens and a currently configured lens mode are mismatched.

Another aspect of the disclosure is another method of lens mode auto-detection by an image capture apparatus. Lens mode auto-detection includes obtaining, from an image sensor of an image capture apparatus, using a currently operative lens of the image capture apparatus and in accordance with a currently configured lens mode, a current input image. Lens mode auto-detection includes, in response to obtaining the current input image, performing lens mode auto-detection by the image capture apparatus. Lens mode auto-detection includes obtaining predicate lens mode data, obtaining probable lens mode data, obtaining a lens mode score in accordance with the predicate lens mode data and the probable lens mode data, determining whether the lens mode score is greater than a defined lens mode change threshold, and, in response to determining that the lens mode score is greater than the defined lens mode change threshold, outputting for presentation to a user of the image capture apparatus, lens mode data indicating that the currently operative lens and the currently configured lens mode are mismatched.

BRIEF DESCRIPTION OF THE DRAWINGS

The disclosure is best understood from the following detailed description when read in conjunction with the accompanying drawings. It is emphasized that, according to common practice, the various features of the drawings are not to-scale. On the contrary, the dimensions of the various features are arbitrarily expanded or reduced for clarity.

DETAILED DESCRIPTION

Figure 1A:
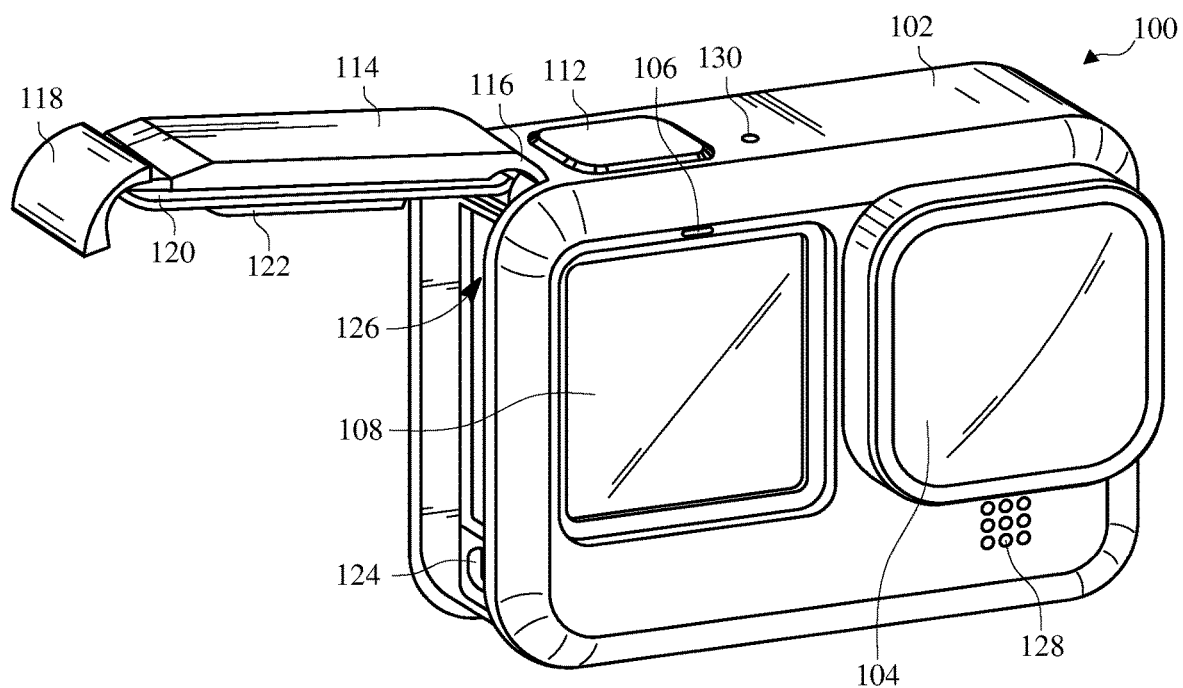
FIGS. 1A-B are isometric views of an example of an image capture apparatus.

An image capture apparatus or device may be designed to be operated using one or more lenses, wherein one or more of the lenses may be attachable, so that the respective lens is operable for image capture, and detachable, so that the image capture apparatus or device operates to capture one or more images using a lens other than the disconnected lens. The current operative lens may receive and direct light to the image sensor of the image capture apparatus. The portion or portions of the image sensor to which the received light is directed may depend on the operative lens. For example, a primary lens may be attached, or otherwise operatively connected, to the image capture apparatus, and the primary lens may direct light to the image sensor, including the respective portions of the image sensor. In another example, an alternate lens, which may be a fisheye lens, may be attached, or otherwise operatively connected, to the image capture apparatus, and the alternate lens may direct light to a circle at the center of the image sensor, such that relatively little, or no, light is directed to corner portions of the image sensor.

The image capture apparatus may include one more settings, or configurations, such as image capture settings, image processing settings, or both, that are used to control the capture, processing, or both, of images by the image capture apparatus. The settings may include one or more settings, or configurations, associated with one or more of the lenses. For example, image capture and processing settings may include a current lens mode, or a currently configured lens mode, which may have a first value associated with using the primary lens and a second value associated with using the alternate lens. Other lenses and settings may be used. In some implementations, the currently configured lens mode may indicate a mode, such as primary lens mode or alternate lens mode, that corresponds with the current operative lens, such that image capture and processing is performed efficiently and accurately. In some implementations, the currently configured lens mode may indicate a mode, such as primary lens mode or alternate lens mode, that conflicts with the current operative lens, such that image capture, processing, or both, such as for stabilization, auto-exposure, auto-white balance, or other image processing, are performed inefficiently, inaccurately, or both. Although described herein as inaccurate, in some implementations, a mismatch between lens and lens mode, such as using the alternate lens and the primary lens mode, may be used to obtain a distorted image.

For example, the image data corresponding to one or more of the corner portions of an image captured using the primary lens may include values corresponding to receiving, or detecting, substantial amounts of light, and image processing in accordance with the primary image mode may utilize the image data corresponding to the corner portions of the image, corresponding to the corner portions of the image sensor, such that the image processing is efficient and accurate, whereas image processing of the image in accordance with the alternate image mode may omit utilizing the image data corresponding to the corner portions of the image, corresponding to the corner portions of the image sensor, such that the image processing is inefficient, inaccurate, or both.

In another example, the image data corresponding to one or more of the corner portions of an image captured using the alternate lens, wherein the alternate lens is a fisheye lens, may include values corresponding to receiving, or detecting, substantially little, or no, light, and image processing in accordance with the primary image mode may utilize the image data corresponding to the corner portions of the image, corresponding to the corner portions of the image sensor, which may have values substantially close to black or zero light, such that the image processing is inefficient, inaccurate, or both, whereas image processing of the image in accordance with the alternate image mode may omit utilizing the image data corresponding to the corner portions of the image, corresponding to the corner portions of the image sensor, such that the image processing is efficient and accurate.

In some implementations, express data indicating the connected, or attached, operative lens may be unavailable or inaccessible to the image capture apparatus, or a component thereof. For example, the current lens mode of the image capture apparatus may be a primary lens mode, a user of the image capture apparatus may operatively connect an alternate lens, such as a fisheye lens, and the user may omit setting, or configuring, the current lens mode to the alternate lens mode, such that the configured lens mode and the operatively connected lens are inconsistent, incompatible, or mismatched. In another example, the current lens mode of the image capture apparatus may be the alternate lens mode, a user of the image capture apparatus may operatively connect the primary lens, and the user may omit setting, or configuring, the current lens mode to the primary lens mode, such that the configured lens mode and the operatively connected lens are inconsistent, incompatible, or mismatched.

To improve the accuracy, efficiency, or both, of the image capture apparatus, lens mode auto-detection may be performed. In the absence of data expressly indicating a mismatch between the lens and the lens mode, lens mode auto-detection may detect a mismatch between the lens and the lens mode using image analysis and may automatically output data, such as a user interface notification, the currently configured lens mode may be inconsistent with the currently operative lens. In some implementations, lens mode auto-detection may include automatically adjusting image processing to improve image quality for images captured by a lens that is inconsistent with the currently configured lens mode.

Figure 1B:
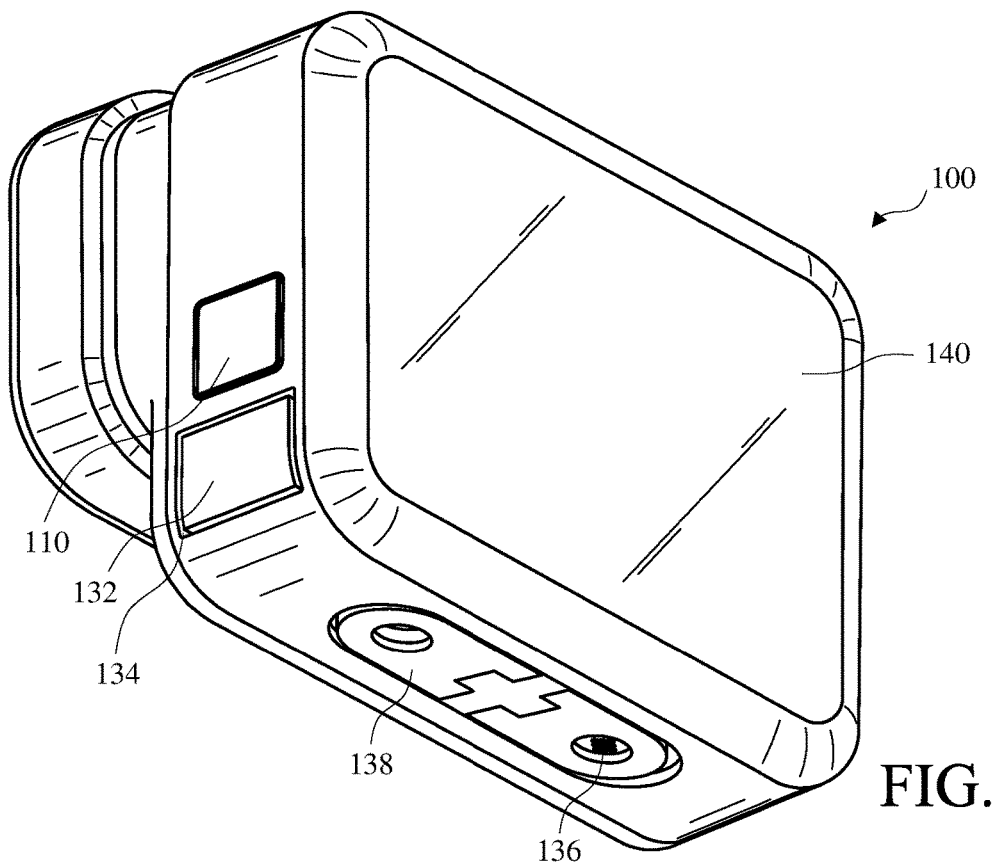
Figure 3:
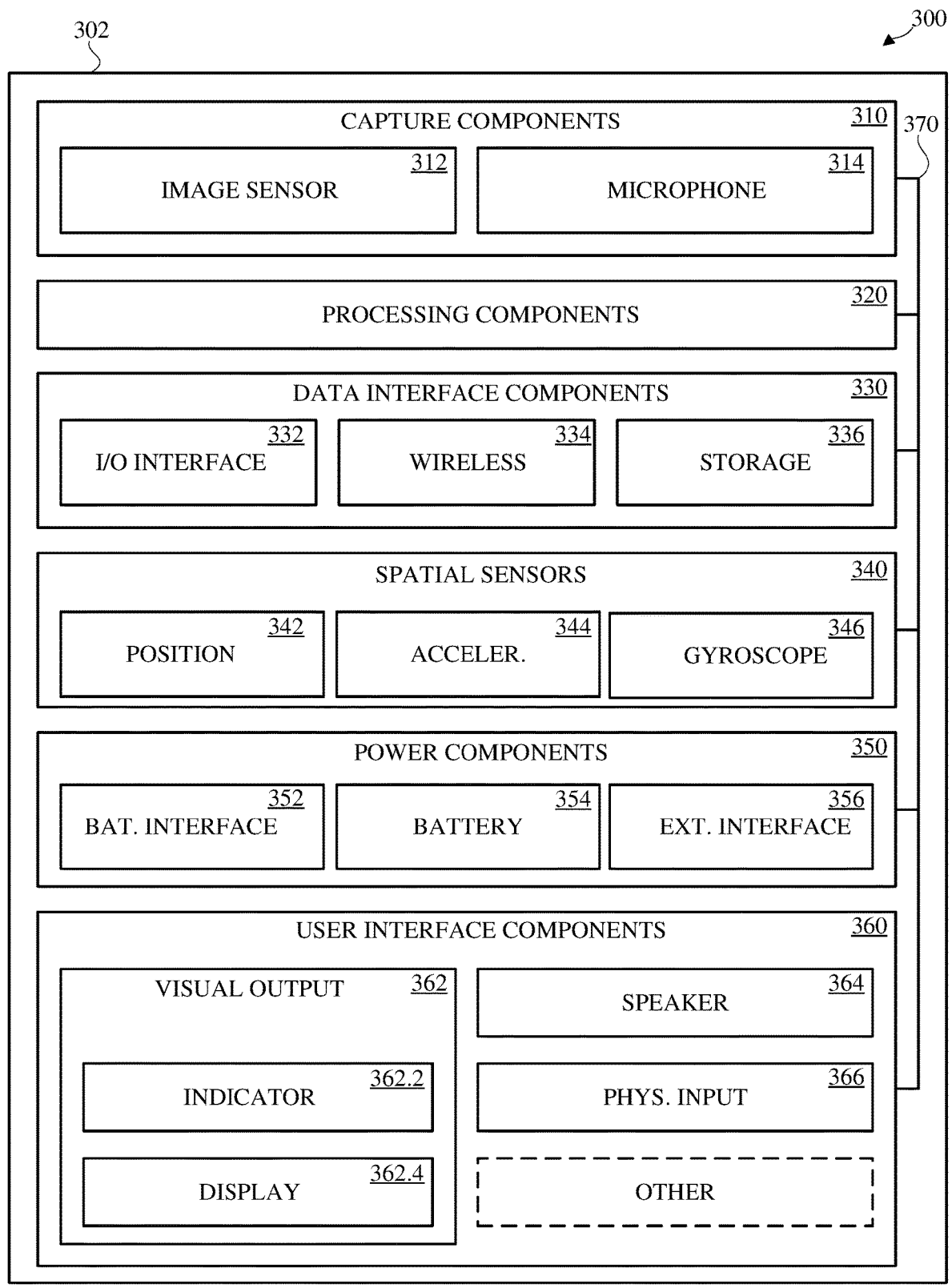
FIG. 3 is a block diagram of electronic components of an image capture apparatus.

FIGS. 1A-B are isometric views of an example of an image capture apparatus 100. The image capture apparatus 100 includes a body 102, an image capture device 104, an indicator 106, a display 108, a mode button 110, a shutter button 112, a door 114, a hinge mechanism 116, a latch mechanism 118, a seal 120, a battery interface 122, a data interface 124, a battery receptacle 126, microphones 128, 130, 132, a speaker 136, an interconnect mechanism 138, and a display 140. Although not expressly shown in FIG. 1, the image capture apparatus 100 includes internal electronics, such as imaging electronics, power electronics, and the like, internal to the body 102 for capturing images and performing other functions of the image capture apparatus 100. An example showing internal electronics is shown in FIG. 3. The arrangement of the components of the image capture apparatus 100 shown in FIGS. 1A-B is an example, other arrangements of elements may be used, except as is described herein or as is otherwise clear from context.

The body 102 of the image capture apparatus 100 may be made of a rigid material such as plastic, aluminum, steel, or fiberglass. Other materials may be used.

As shown in FIG. 1A, the image capture apparatus 100 includes the image capture device 104 structured on a front surface of, and within, the body 102. The image capture device 104 includes a lens. The lens of the image capture device 104 receives light incident upon the lens of the image capture device 104 and directs the received light onto an image sensor of the image capture device 104 internal to the body 102. The image capture apparatus 100 may capture one or more images, such as a sequence of images, such as video. The image capture apparatus 100 may store the captured images and video for subsequent display, playback, or transfer to an external device. Although one image capture device 104 is shown in FIG. 1A, the image capture apparatus 100 may include multiple image capture devices, which may be structured on respective surfaces of the body 102.

As shown in FIG. 1A, the image capture apparatus 100 includes the indicator 106 structured on the front surface of the body 102. The indicator 106 may output, or emit, visible light, such as to indicate a status of the image capture apparatus 100. For example, the indicator 106 may be a light-emitting diode (LED). Although one indicator 106 is shown in FIG. 1A, the image capture apparatus 100 may include multiple indictors structured on respective surfaces of the body 102.

As shown in FIG. 1A, the image capture apparatus 100 includes the display 108 structured on the front surface of the body 102. The display 108 outputs, such as presents or displays, such as by emitting visible light, information, such as to show image information such as image previews, live video capture, or status information such as battery life, camera mode, elapsed time, and the like. In some implementations, the display 108 may be an interactive display, which may receive, detect, or capture input, such as user input representing user interaction with the image capture apparatus 100. Although one display 108 is shown in FIG. 1A, the image capture apparatus 100 may include multiple displays, which may be structured on respective surfaces of the body 102. In some implementations, the display 108 may be omitted or combined with another component of the image capture apparatus 100.

As shown in FIG. 1B, the image capture apparatus 100 includes the mode button 110 structured on a side surface of the body 102. Although described as a button, the mode button 110 may be another type of input device, such as a switch, a toggle, a slider, or a dial. Although one mode button 110 is shown in FIG. 1B, the image capture apparatus 100 may include multiple mode, or configuration, buttons structured on respective surfaces of the body 102. In some implementations, the mode button 110 may be omitted or combined with another component of the image capture apparatus 100. For example, the display 108 may be an interactive, such as touchscreen, display, and the mode button 110 may be physically omitted and functionally combined with the display 108.

As shown in FIG. 1A, the image capture apparatus 100 includes the shutter button 112 structured on a top surface of the body 102. Although described as a button, the shutter button 112 may be another type of input device, such as a switch, a toggle, a slider, or a dial. Although one shutter button 112 is shown in FIG. 1A, the image capture apparatus 100 may include multiple shutter buttons structured on respective surfaces of the body 102. In some implementations, the shutter button 112 may be omitted or combined with another component of the image capture apparatus 100.

The mode button 110, the shutter button 112, or both, obtain input data, such as user input data in accordance with user interaction with the image capture apparatus 100. For example, the mode button 110, the shutter button 112, or both, may be used to turn the image capture apparatus 100 on and off, scroll through modes and settings, and select modes and change settings.

As shown in FIG. 1A, the image capture apparatus 100 includes the door 114 coupled to the body 102, such as using the hinge mechanism 116. The door 114 may be secured to the body 102 using the latch mechanism 118 that releasably engages the body 102 at a position generally opposite the hinge mechanism 116. As shown in FIG. 1A, the door 114 includes the seal 120 and the battery interface 122. Although one door 114 is shown in FIG. 1A, the image capture apparatus 100 may include multiple doors respectively forming respective surfaces of the body 102, or portions thereof. Although not shown in FIGS. 1A-B, the door 114 may be removed from the body 102 by releasing the latch mechanism 118 from the body 102 and decoupling the hinge mechanism 116 from the body 102.

In FIG. 1A, the door 114 is shown in an open position such that the data interface 124 is accessible for communicating with external devices and the battery receptacle 126 is accessible for placement or replacement of a battery (not shown).

In FIG. 1B, the door 114 is shown in a closed position. In implementations in which the door 114 is in the closed position the seal 120 engages a flange (not shown) to provide an environmental seal. In implementations in which the door 114 is in the closed position the battery interface 122 engages the battery to secure the battery in the battery receptacle 126.

As shown in FIG. 1A, the image capture apparatus 100 includes the battery receptacle 126 structured to form a portion of an interior surface of the body 102. The battery receptacle 126 includes operative connections (not shown) for power transfer between the battery and the image capture apparatus 100. In some implementations, the battery receptable 126 may be omitted. Although one battery receptacle 126 is shown in FIG. 1A, the image capture apparatus 100 may include multiple battery receptacles.

As shown in FIG. 1A, the image capture apparatus 100 includes a first microphone 128 structured on a front surface of the body 102. As shown in FIG. 1A, the image capture apparatus 100 includes a second microphone 130 structured on a top surface of the body 102. As shown in FIG. 1B, the image capture apparatus 100 includes the drain microphone 132 structured on a side surface of the body 102. The drain microphone 132 is a microphone located behind a drain cover, including a drainage channel 134 for draining liquid from audio components of the image capture apparatus 100, including the drain microphone 132. The image capture apparatus 100 may include other microphones (not shown) on other surfaces of the body 102. The microphones 128, 130, 132 receive and record audio, such as in conjunction with capturing video or separate from capturing video. In some implementations, one or more of the microphones 128, 130, 132 may be omitted or combined with other components of the image capture apparatus 100.

As shown in FIG. 1B, the image capture apparatus 100 includes the speaker 136 structured on a bottom surface of the body 102. The speaker 136 outputs or presents audio, such as by playing back recorded audio or emitting sounds associated with notifications. Although one speaker 136 is shown in FIG. 1B, the image capture apparatus 100 may include multiple speakers structured on respective surfaces of the body 102.

As shown in FIG. 1B, the image capture apparatus 100 includes the interconnect mechanism 138 structured on a bottom surface of the body 102. The interconnect mechanism 138 removably connects the image capture apparatus 100 to an external structure, such as a handle grip, another mount, or a securing device. As shown in FIG. 1B, the interconnect mechanism 138 includes folding protrusions configured to move between a nested or collapsed position as shown in FIG. 1B and an extended or open position (not shown in FIG. 1B). The folding protrusions of the interconnect mechanism 138 shown in the collapsed position in FIG. 1B may be similar to the folding protrusions of the interconnect mechanism 214 shown in the extended or open position in FIGS. 2A-2B, except as is described herein or as is otherwise clear from context. The folding protrusions of the interconnect mechanism 138 in the extended or open position may be coupled to reciprocal protrusions of other devices such as handle grips, mounts, clips, or like devices. Although one interconnect mechanism 138 is shown in FIG. 1B, the image capture apparatus 100 may include multiple interconnect mechanisms structured on, or forming a portion of, respective surfaces of the body 102. In some implementations, the interconnect mechanism 138 may be omitted.

As shown in FIG. 1B, the image capture apparatus 100 includes the display 140 structured on, and forming a portion of, a rear surface of the body 102. The display 140 outputs, such as presents or displays, such as by emitting visible light, data, such as to show image information such as image previews, live video capture, or status information such as battery life, camera mode, elapsed time, and the like. In some implementations, the display 140 may be an interactive display, which may receive, detect, or capture input, such as user input representing user interaction with the image capture apparatus 100. Although one display 140 is shown in FIG. 1B, the image capture apparatus 100 may include multiple displays structured on respective surfaces of the body 102. In some implementations, the display 140 may be omitted or combined with another component of the image capture apparatus 100.

The image capture apparatus 100 may include features or components other than those described herein, such as other buttons or interface features. In some implementations, interchangeable lenses, cold shoes, and hot shoes, or a combination thereof, may be coupled to or combined with the image capture apparatus 100.

Although not shown in FIGS. 1A-1B, the image capture apparatus 100 may communicate with an external device, such as an external user interface device (not shown), via a wired or wireless computing communication link, such as via the data interface 124. The computing communication link may be a direct computing communication link or an indirect computing communication link, such as a link including another device or a network, such as the Internet. The image capture apparatus 100 may transmit images to the external device via the computing communication link. The external device may store, process, display, or combination thereof, the images. The external user interface device may be a computing device, such as a smartphone, a tablet computer, a phablet, a smart watch, a portable computer, personal computing device, or another device or combination of devices configured to receive user input, communicate information with the image capture apparatus 100 via the computing communication link, or receive user input and communicate information with the image capture apparatus 100 via the computing communication link. The external user interface device may implement or execute one or more applications to manage or control the image capture apparatus 100. For example, the external user interface device may include an application for controlling camera configuration, video acquisition, video display, or any other configurable or controllable aspect of the image capture apparatus 100. In some implementations, the external user interface device may generate and share, such as via a cloud-based or social media service, one or more images or video clips. In some implementations, the external user interface device may display unprocessed or minimally processed images or video captured by the image capture apparatus 100 contemporaneously with capturing the images or video by the image capture apparatus 100, such as for shot framing or live preview.

Figure 2A:
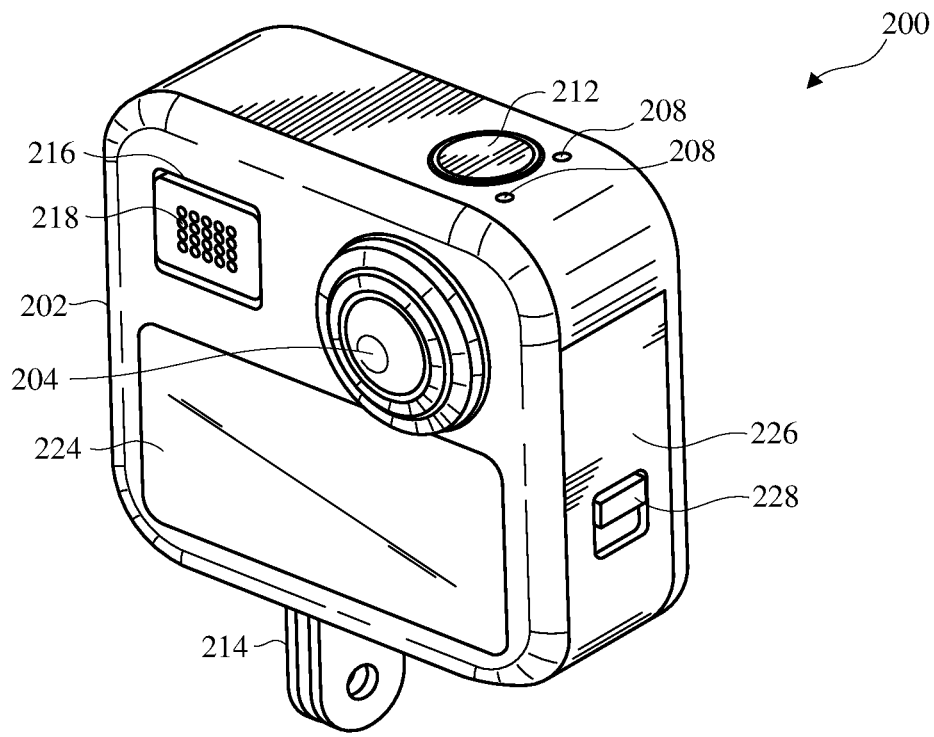
FIGS. 2A-B are isometric views of another example of an image capture apparatus.
Figure 2B:
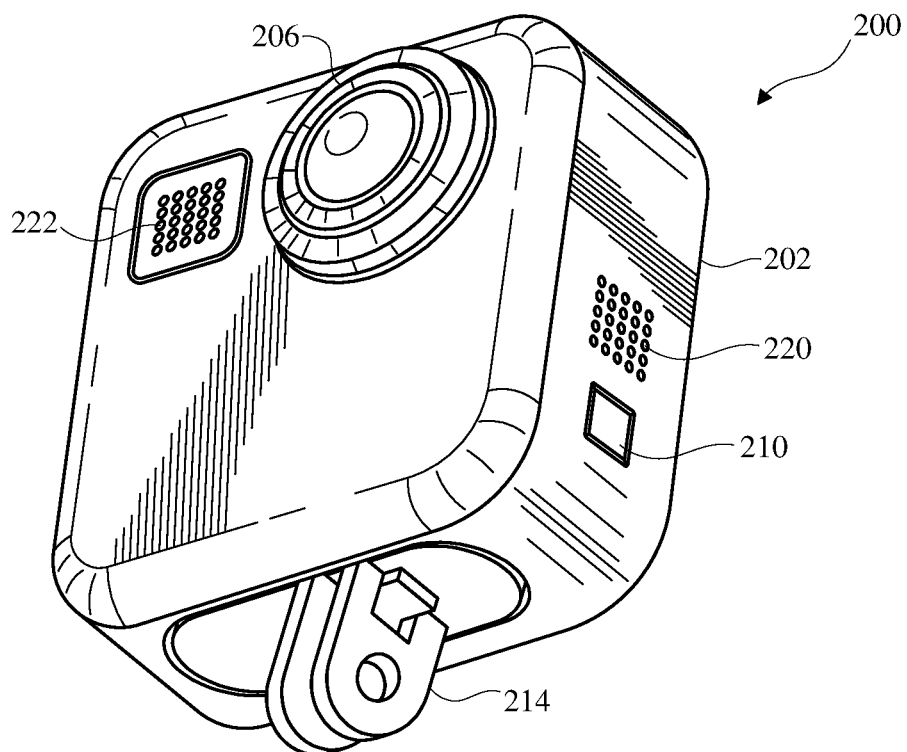

FIGS. 2A-2B illustrate another example of an image capture apparatus 200. The image capture apparatus 200 is similar to the image capture apparatus 100 shown in FIGS. 1A-B, except as is described herein or as is otherwise clear from context. The image capture apparatus 200 includes a body 202, a first image capture device 204, a second image capture device 206, indicators 208, a mode button 210, a shutter button 212, an interconnect mechanism 214, a drainage channel 216, audio components 218, 220, 222, a display 224, and a door 226 including a release mechanism 228. The arrangement of the components of the image capture apparatus 200 shown in FIGS. 2A-2B is an example, other arrangements of elements may be used, except as is described herein or as is otherwise clear from context.

The body 202 of the image capture apparatus 200 may be similar to the body 102 shown in FIGS. 1A-1B, except as is described herein or as is otherwise clear from context.

As shown in FIG. 2A, the image capture apparatus 200 includes the first image capture device 204 structured on a front surface of the body 202. The first image capture device 204 includes a first lens. The first image capture device 204 may be similar to the image capture device 104 shown in FIG. 1A, except as is described herein or as is otherwise clear from context. As shown in FIG. 2B, the image capture apparatus 200 includes the second image capture device 206 structured on a rear surface of the body 202. The second image capture device 206 includes a second lens. The second image capture device 206 may be similar to the image capture device 104 shown in FIG. 1A, except as is described herein or as is otherwise clear from context. The image capture devices 204, 206 are disposed on opposing surfaces of the body 202, for example, in a back-to-back configuration, Janus configuration, or offset Janus configuration. Although two image capture devices 204, 206 are shown in FIGS. 2A-2B, the image capture apparatus 200 may include other image capture devices structured on respective surfaces of the body 202.

As shown in FIG. 2A, the image capture apparatus 200 includes the indicators 208 structured on a top surface of the body 202. The indicators 208 may be similar to the indicator 106 shown in FIG. 1A, except as is described herein or as is otherwise clear from context. For example, one of the indicators 208 may indicate a status of the first image capture device 204 and another one of the indicators 208 may indicate a status of the second image capture device 206. Although two indicator 208 are shown in FIGS. 2A-2B, the image capture apparatus 200 may include other indictors structured on respective surfaces of the body 202.

As shown in FIGS. 2A-B, the image capture apparatus 200 includes input mechanisms including a mode button 210, structured on a side surface of the body 202, and a shutter button 212, structured on a top surface of the body 202. The mode button 210 may be similar to the mode button 110 shown in FIG. 1B, except as is described herein or as is otherwise clear from context. The shutter button 212 may be similar to the shutter button 112 shown in FIG. 1A, except as is described herein or as is otherwise clear from context.

The image capture apparatus 200 includes internal electronics (not expressly shown), such as imaging electronics, power electronics, and the like, internal to the body 202 for capturing images and performing other functions of the image capture apparatus 200. An example showing internal electronics is shown in FIG. 3.

As shown in FIGS. 2A-2B, the image capture apparatus 200 includes the interconnect mechanism 214 structured on a bottom surface of the body 202. The interconnect mechanism 214 may be similar to the interconnect mechanism 138 shown in FIG. 1B, except as is described herein or as is otherwise clear from context. For example, the interconnect mechanism 138 shown in FIG. 1B is shown in the nested or collapsed position and the interconnect mechanism 214 shown in FIGS. 2A-2B are shown in an extended or open position.

As shown in FIG. 2A, the image capture apparatus 200 includes the drainage channel 216 for draining liquid from audio components of the image capture apparatus 200.

As shown in FIGS. 2A-2B, the image capture apparatus 200 includes the audio components 218, 220, 222, respectively structured on respective surfaces of the body 202. The audio components 218, 220, 222 may be similar to the microphones 128, 130, 132 and the speaker 136 shown in FIGS. 1A-1B, except as is described herein or as is otherwise clear from context. One or more of the audio components 218, 220, 222 may be, or may include, audio sensors, such as microphones, to receive and record audio signals, such as voice commands or other audio, in conjunction with capturing images or video. One or more of the audio components 218, 220, 222 may be, or may include, an audio presentation component that may present, or play, audio, such as to provide notifications or alerts. As shown in FIG. 2A, a first audio component 218 is located on a front surface of the body 202. As shown in FIG. 2B, a second audio component 220 is located on a side surface of the body 202, and a third audio component 222 is located on a back surface of the body 202. Other numbers and configurations for the audio components may be used.

As shown in FIG. 2A, the image capture apparatus 200 includes the display 224 structured on a front surface of the body 202. The display 224 may be similar to the displays 108, 140 shown in FIGS. 1A-1B, except as is described herein or as is otherwise clear from context. The display 224 may include an I/O interface. The display 224 may receive touch inputs. The display 224 may display image information during video capture. The display 224 may provide status information to a user, such as status information indicating battery power level, memory card capacity, time elapsed for a recorded video, etc. Although one display 224 is shown in FIG. 2A, the image capture apparatus 200 may include multiple displays structured on respective surfaces of the body 202. In some implementations, the display 224 may be omitted or combined with another component of the image capture apparatus 200.

As shown in FIG. 2A, the image capture apparatus 200 includes the door 226 structured on, or forming a portion of, the side surface of the body 202. The door 226 may be similar to the door 114 shown in FIG. 1A, except as is described herein or as is otherwise clear from context. For example, the door 226 shown in FIG. 2A includes a release mechanism 228. The release mechanism 228 may include a latch, a button, or another mechanism configured to receive a user input that allows the door 226 to change position. The release mechanism 228 may be used to open the door 226 for a user to access a battery, a battery receptacle, an I/O interface, a memory card interface, etc. (not shown)

In some embodiments, the image capture apparatus 200 may include features or components other than those described herein, some features or components described herein may be omitted, or some features or components described herein may be combined. For example, the image capture apparatus 200 may include additional interfaces or different interface features, interchangeable lenses, cold shoes, or hot shoes.

Figure 2C:
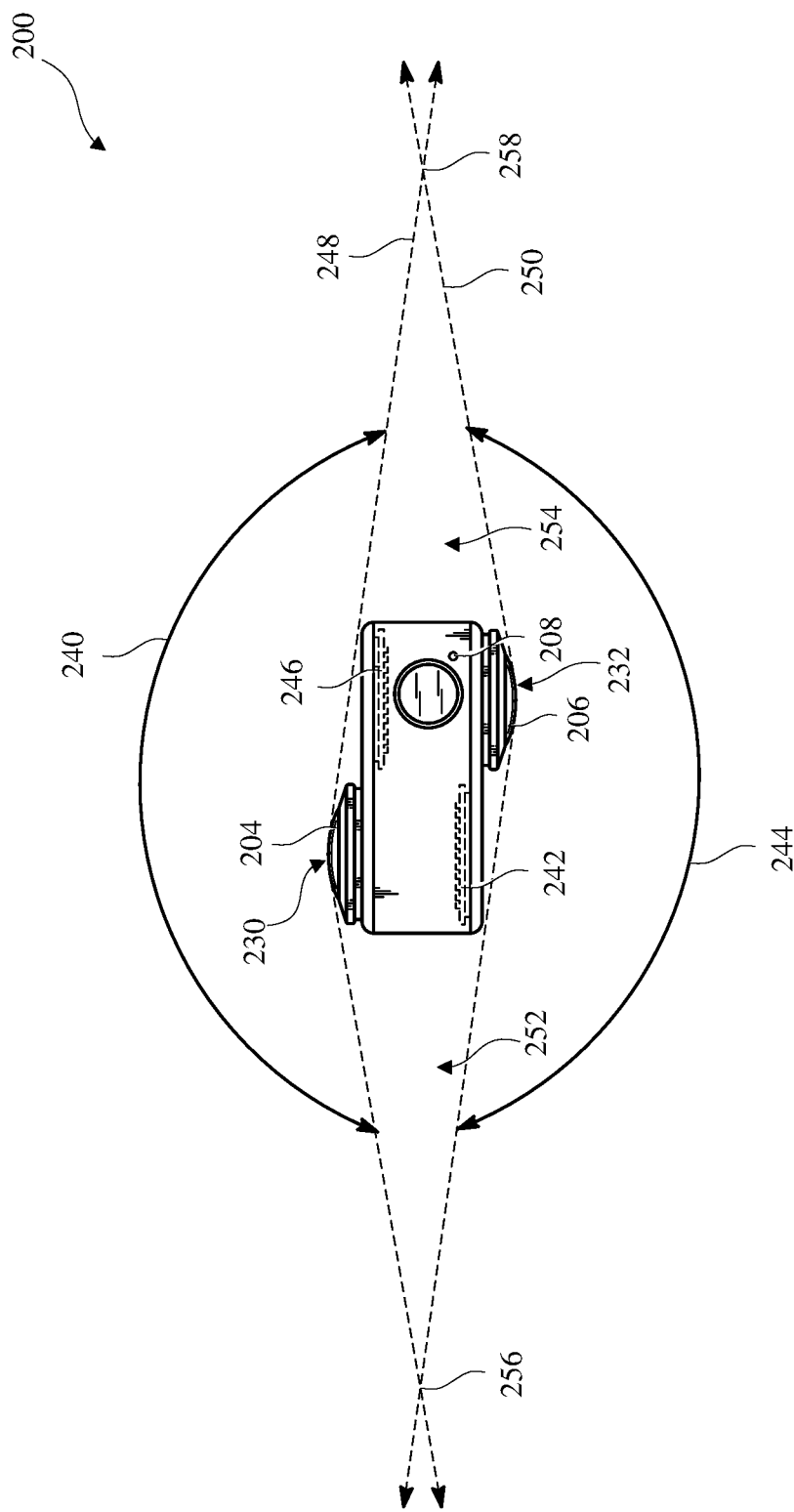
FIG. 2C is a top view of the image capture apparatus of FIGS. 2A-B.

FIG. 2C is a top view of the image capture apparatus 200 of FIGS. 2A-2B. For simplicity, some features or components of the image capture apparatus 200 shown in FIGS. 2A-2B are omitted from FIG. 2C.

As shown in FIG. 2C, the first image capture device 204 includes a first lens 230 and the second image capture device 206 includes a second lens 232. The image capture apparatus 200 captures spherical images. For example, the first image capture device 204 may capture a first image, such as a first hemispheric, or hyper-hemispherical, image, the second image capture device 206 may capture a second image, such as a second hemispheric, or hyper-hemispherical, image, and the image capture apparatus 200 may generate a spherical image incorporating or combining the first image and the second image, which may be captured concurrently, or substantially concurrently.

The first image capture device 204 defines a first field-of-view 240 wherein the first lens 230 of the first image capture device 204 receives light. The first lens 230 directs the received light corresponding to the first field-of-view 240 onto a first image sensor 242 of the first image capture device 204. For example, the first image capture device 204 may include a first lens barrel (not expressly shown), extending from the first lens 230 to the first image sensor 242.

The second image capture device 206 defines a second field-of-view 244 wherein the second lens 232 receives light. The second lens 232 directs the received light corresponding to the second field-of-view 244 onto a second image sensor 246 of the second image capture device 206. For example, the second image capture device 206 may include a second lens barrel (not expressly shown), extending from the second lens 232 to the second image sensor 246.

A boundary 248 of the first field-of-view 240 is shown using broken directional lines. A boundary 250 of the second field-of-view 244 is shown using broken directional lines. As shown, the image capture devices 204, 206 are arranged in a back-to-back (Janus) configuration such that the lenses 230, 232 face in generally opposite directions, such that the image capture apparatus 200 may capture spherical images. The first image sensor 242 captures a first hyper-hemispherical image plane from light entering the first lens 230. The second image sensor 246 captures a second hyper-hemispherical image plane from light entering the second lens 232.

As shown in FIG. 2C, the fields-of-view 240, 244 partially overlap such that the combination of the fields-of-view 240, 244 form a spherical field-of-view, except that one or more uncaptured areas 252, 254 may be outside of the fields-of-view 240, 244 of the lenses 230, 232. Light emanating from or passing through the uncaptured areas 252, 254, which may be proximal to the image capture apparatus 200, may be obscured from the lenses 230, 232 and the corresponding image sensors 242, 246, such that content corresponding to the uncaptured areas 252, 254 may be omitted from images captured by the image capture apparatus 200. In some implementations, the image capture devices 204, 206, or the lenses 230, 232 thereof, may be configured to minimize the uncaptured areas 252, 254.

Examples of points of transition, or overlap points, from the uncaptured areas 252, 254 to the overlapping portions of the fields-of-view 240, 244 are shown at 256, 258.

Images contemporaneously captured by the respective image sensors 242, 246 may be combined to form a combined image, such as a spherical image. Generating a combined image may include correlating the overlapping regions captured by the respective image sensors 242, 246, aligning the captured fields-of-view 240, 244, and stitching the images together to form a cohesive combined image. Stitching the images together may include correlating the overlap points 256, 258 with respective locations in corresponding images captured by the image sensors 242, 246. Although a planar view of the fields-of-view 240, 244 is shown in FIG. 2C, the fields-of-view 240, 244 are hyper-hemispherical.

A change in the alignment, such as position, tilt, or a combination thereof, of the image capture devices 204, 206, such as of the lenses 230, 232, the image sensors 242, 246, or both, may change the relative positions of the respective fields-of-view 240, 244, may change the locations of the overlap points 256, 258, such as with respect to images captured by the image sensors 242, 246, and may change the uncaptured areas 252, 254, which may include changing the uncaptured areas 252, 254 unequally.

Incomplete or inaccurate information indicating the alignment of the image capture devices 204, 206, such as the locations of the overlap points 256, 258, may decrease the accuracy, efficiency, or both of generating a combined image. In some implementations, the image capture apparatus 200 may maintain information indicating the location and orientation of the image capture devices 204, 206, such as of the lenses 230, 232, the image sensors 242, 246, or both, such that the fields-of-view 240, 244, the overlap points 256, 258, or both may be accurately determined, which may improve the accuracy, efficiency, or both of generating a combined image.

The lenses 230, 232 may be aligned along an axis (not shown), laterally offset from each other, off-center from a central axis of the image capture apparatus 200, or laterally offset and off-center from the central axis. As compared to image capture devices with back-to-back lenses, such as lenses aligned along the same axis, image capture devices including laterally offset lenses may include substantially reduced thickness relative to the lengths of the lens barrels securing the lenses. For example, the overall thickness of the image capture apparatus 200 may be close to the length of a single lens barrel as opposed to twice the length of a single lens barrel as in a back-to-back lens configuration. Reducing the lateral distance between the lenses 230, 232 may improve the overlap in the fields-of-view 240, 244, such as by reducing the uncaptured areas 252, 254.

Images or frames captured by the image capture devices 204, 206 may be combined, merged, or stitched together to produce a combined image, such as a spherical or panoramic image, which may be an equirectangular planar image. In some implementations, generating a combined image may include use of techniques such as noise reduction, tone mapping, white balancing, or other image correction. In some implementations, pixels along a stitch boundary, which may correspond with the overlap points 256, 258, may be matched accurately to minimize boundary discontinuities.

FIG. 3 is a block diagram of electronic components in an image capture apparatus 300. The image capture apparatus 300 may be a single-lens image capture device, a multi-lens image capture device, or variations thereof, including an image capture apparatus with multiple capabilities such as the use of interchangeable integrated sensor lens assemblies. Components, such as electronic components, of the image capture apparatus 100 shown in FIGS. 1A-B, or the image capture apparatus 200 shown in FIGS. 2A-C, may be implemented as shown in FIG. 3, except as is described herein or as is otherwise clear from context.

The image capture apparatus 300 includes a body 302. The body 302 may be similar to the body 102 shown in FIGS. 1A-1B, or the body 202 shown in FIGS. 2A-B, except as is described herein or as is otherwise clear from context. The body 302 includes electronic components such as capture components 310, processing components 320, data interface components 330, spatial sensors 340, power components 350, user interface components 360, and a bus 370.

The capture components 310 include an image sensor 312 for capturing images. Although one image sensor 312 is shown in FIG. 3, the capture components 310 may include multiple image sensors. The image sensor 312 may be similar to the image sensors 242, 246 shown in FIG. 2C, except as is described herein or as is otherwise clear from context. The image sensor 312 may be, for example, a charge-coupled device (CCD) sensor, an active pixel sensor (APS), a complementary metal-oxide-semiconductor (CMOS) sensor, or an N-type metal-oxide-semiconductor (NMOS) sensor. The image sensor 312 detects light, such as within a defined spectrum, such as the visible light spectrum or the infrared spectrum, incident through a corresponding lens such as the lens 230 with respect to the image sensor 242 as shown in FIG. 2C or the lens 232 with respect to the image sensor 246 as shown in FIG. 2C. The image sensor 312 captures detected light as image data and conveys the captured image data as electrical signals (image signals or image data) to the other components of the image capture apparatus 300, such as to the processing components 320, such as via the bus 370.

The capture components 310 include a microphone 314 for capturing audio. Although one microphone 314 is shown in FIG. 3, the capture components 310 may include multiple microphones. The microphone 314 detects and captures, or records, sound, such as sound waves incident upon the microphone 314. The microphone 314 may detect, capture, or record sound in conjunction with capturing images by the image sensor 312. The microphone 314 may detect sound to receive audible commands to control the image capture apparatus 300. The microphone 314 may be similar to the microphones 128, 130, 132 shown in FIGS. 1A-1B or the audio components 218, 220, 222 shown in FIGS. 2A-2B, except as is described herein or as is otherwise clear from context.

The processing components 320 perform image signal processing, such as filtering, tone mapping, or stitching, to generate, or obtain, processed images, or processed image data, based on image data obtained from the image sensor 312. The processing components 320 may include one or more processors having single or multiple processing cores. In some implementations, the processing components 320 may include, or may be, an application specific integrated circuit (ASIC) or a digital signal processor (DSP). For example, the processing components 320 may include a custom image signal processor. The processing components 320 conveys data, such as processed image data, with other components of the image capture apparatus 300 via the bus 370. In some implementations, the processing components 320 may include an encoder, such as an image or video encoder that may encode, decode, or both, the image data, such as for compression coding, transcoding, or a combination thereof.

Although not shown expressly in FIG. 3, the processing components 320 may include memory, such as a random-access memory (RAM) device, which may be non-transitory computer-readable memory. The memory of the processing components 320 may include executable instructions and data that can be accessed by the processing components 320.

The data interface components 330 communicates with other, such as external, electronic devices, such as a remote control, a smartphone, a tablet computer, a laptop computer, a desktop computer, or an external computer storage device. For example, the data interface components 330 may receive commands to operate the image capture apparatus 300. In another example, the data interface components 330 may transmit image data to transfer the image data to other electronic devices. The data interface components 330 may be configured for wired communication, wireless communication, or both. As shown, the data interface components 330 include an I/O interface 332, a wireless data interface 334, and a storage interface 336. In some implementations, one or more of the I/O interface 332, the wireless data interface 334, or the storage interface 336 may be omitted or combined.

The I/O interface 332 may send, receive, or both, wired electronic communications signals. For example, the I/O interface 332 may be a universal serial bus (USB) interface, such as USB type-C interface, a high-definition multimedia interface (HDMI), a FireWire interface, a digital video interface link, a display port interface link, a Video Electronics Standards Associated (VESA) digital display interface link, an Ethernet link, or a Thunderbolt link. Although one I/O interface 332 is shown in FIG. 3, the data interface components 330 include multiple I/O interfaces. The I/O interface 332 may be similar to the data interface 124 shown in FIG. 1A, except as is described herein or as is otherwise clear from context.

The wireless data interface 334 may send, receive, or both, wireless electronic communications signals. The wireless data interface 334 may be a Bluetooth interface, a ZigBee interface, a Wi-Fi interface, an infrared link, a cellular link, a near field communications (NFC) link, or an Advanced Network Technology interoperability (ANT+) link. Although one wireless data interface 334 is shown in FIG. 3, the data interface components 330 include multiple wireless data interfaces. The wireless data interface 334 may be similar to the data interface 124 shown in FIG. 1A, except as is described herein or as is otherwise clear from context.

The storage interface 336 may include a memory card connector, such as a memory card receptacle, configured to receive and operatively couple to a removable storage device, such as a memory card, and to transfer, such as read, write, or both, data between the image capture apparatus 300 and the memory card, such as for storing images, recorded audio, or both captured by the image capture apparatus 300 on the memory card. Although one storage interface 336 is shown in FIG. 3, the data interface components 330 include multiple storage interfaces. The storage interface 336 may be similar to the data interface 124 shown in FIG. 1A, except as is described herein or as is otherwise clear from context.

The spatial, or spatiotemporal, sensors 340 detect the spatial position, movement, or both, of the image capture apparatus 300. As shown in FIG. 3, the spatial sensors 340 include a position sensor 342, an accelerometer 344, and a gyroscope 346. The position sensor 342, which may be a global positioning system (GPS) sensor, may determine a geospatial position of the image capture apparatus 300, which may include obtaining, such as by receiving, temporal data, such as via a GPS signal. The accelerometer 344, which may be a three-axis accelerometer, may measure linear motion, linear acceleration, or both of the image capture apparatus 300. The gyroscope 346, which may be a three-axis gyroscope, may measure rotational motion, such as a rate of rotation, of the image capture apparatus 300. In some implementations, the spatial sensors 340 may include other types of spatial sensors. In some implementations, one or more of the position sensor 342, the accelerometer 344, and the gyroscope 346 may be omitted or combined.

The power components 350 distribute electrical power to the components of the image capture apparatus 300 for operating the image capture apparatus 300. As shown in FIG. 3, the power components 350 include a battery interface 352, a battery 354, and an external power interface 356 (ext. interface). The battery interface 352 (bat. interface) operatively couples to the battery 354, such as via conductive contacts to transfer power from the battery 354 to the other electronic components of the image capture apparatus 300. The battery interface 352 may be similar to the battery receptacle 126 shown in FIG. 1A, except as is described herein or as is otherwise clear from context. The external power interface 356 obtains or receives power from an external source, such as a wall plug or external battery, and distributes the power to the components of the image capture apparatus 300, which may include distributing power to the battery 354 via battery interface 352 to charge the battery 354. Although one battery interface 352, one battery 354, and one external power interface 356 are shown in FIG. 3, any number of battery interfaces, batteries, and external power interfaces may be used. In some implementations, one or more of the battery interface 352, the battery 354, and the external power interface 356 may be omitted or combined. For example, in some implementations, the external interface 356 and the I/O interface 332 may be combined.

The user interface components 360 receive input, such as user input, from a user of the image capture apparatus 300, output, such as display or present, information to a user, or both receive input and output information, such as in accordance with user interaction with the image capture apparatus 300.

As shown in FIG. 3, the user interface components 360 include visual output components 362 to visually communicate information, such as to present captured images. As shown, the visual output components 362 include an indicator 362.2 and a display 362.4. The indicator 362.2 may be similar to the indicator 106 shown in FIG. 1A or the indicators 208 shown in FIG. 2A, except as is described herein or as is otherwise clear from context. The display 362.4 may be similar to the display 108 shown in FIG. 1A, the display 140 shown in FIG. 1B, or the display 224 shown in FIG. 2A, except as is described herein or as is otherwise clear from context. Although the visual output components 362 are shown in FIG. 3 as including one indicator 362.2, the visual output components 362 may include multiple indicators. Although the visual output components 362 are shown in FIG. 3 as including one display 362.4, the visual output components 362 may include multiple displays. In some implementations, one or more of the indicator 362.2 or the display 362.4 may be omitted or combined.

As shown in FIG. 3, the user interface components 360 include a speaker 364. The speaker 364 may be similar to the speaker 136 shown in FIG. 1B or the audio components 218, 220, 222 shown in FIGS. 2A-B, except as is described herein or as is otherwise clear from context. Although one speaker 364 is shown in FIG. 3, the user interface components 360 may include multiple speakers. In some implementations, the speaker 364 may be omitted or combined with another component of the image capture apparatus 300, such as the microphone 314.

As shown in FIG. 3, the user interface components 360 include a physical input interface 366. The physical input interface 366 may be similar to the shutter button 112 shown in FIG. 1A, the mode button 110 shown in FIG. 1B, the shutter button 212 shown in FIG. 2A, or the mode button 210 shown in FIG. 2B, except as is described herein or as is otherwise clear from context. Although one physical input interface 366 is shown in FIG. 3, the user interface components 360 may include multiple physical input interfaces. In some implementations, the physical input interface 366 may be omitted or combined with another component of the image capture apparatus 300. The physical input interface 366 may be, for example, a button, a toggle, a switch, a dial, or a slider.

As shown in FIG. 3, the user interface components 360 include a broken line border box labeled "other", to indicate that components of the image capture apparatus 300 other than the components expressly shown as included in the user interface components 360 may be user interface components. For example, the microphone 314 may receive, or capture, and process audio signals to obtain input data, such as user input data corresponding to voice commands. In another example, the image sensor 312 may receive, or capture, and process image data to obtain input data, such as user input data corresponding to visible gesture commands. In another example, one or more of the spatial sensors 340, such as a combination of the accelerometer 344 and the gyroscope 346, may receive, or capture, and process motion data to obtain input data, such as user input data corresponding to motion gesture commands.

Figure 4:
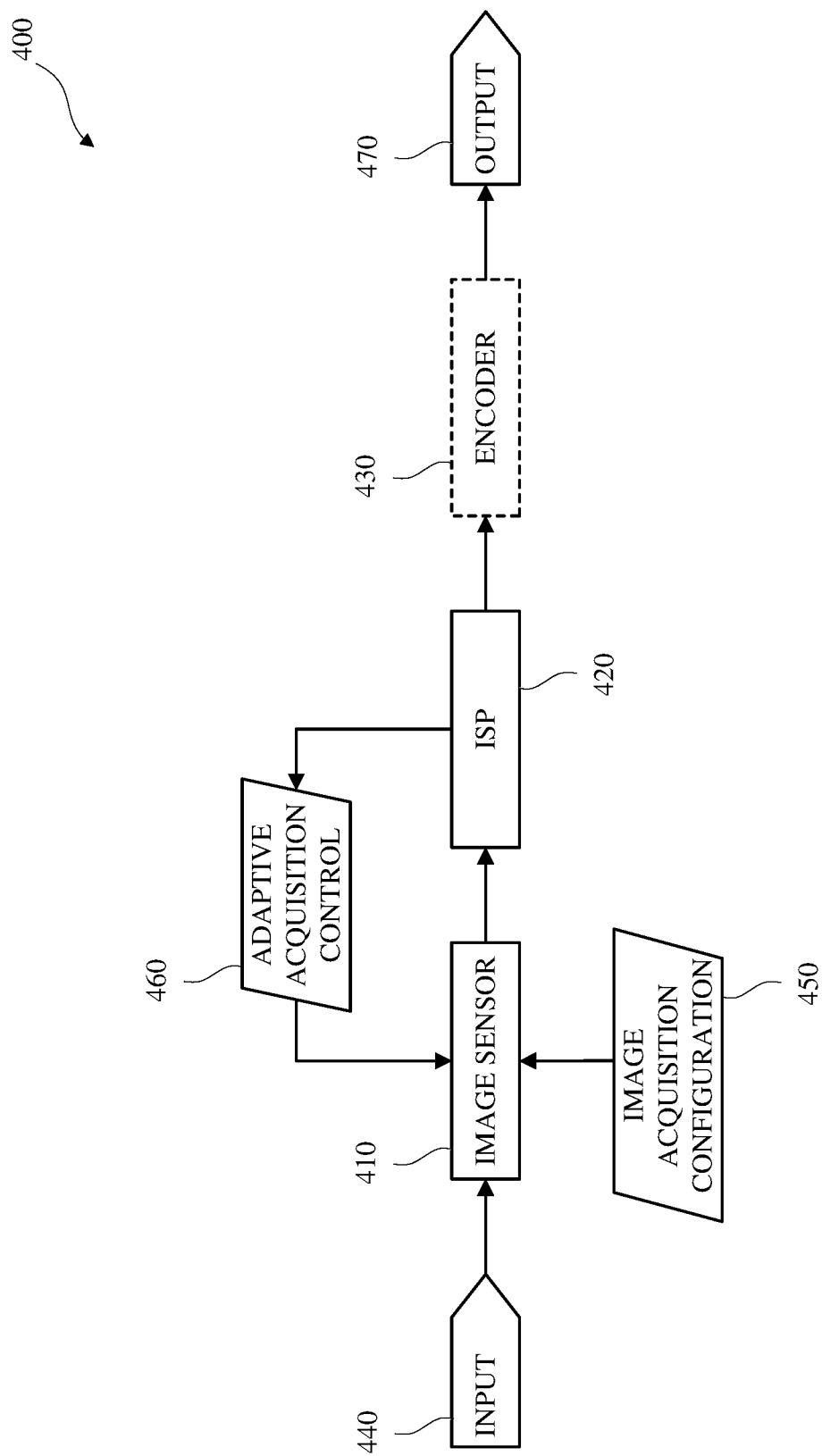
FIG. 4 is a flow diagram of an example of an image processing pipeline.

FIG. 4 is a block diagram of an example of an image processing pipeline 400. The image processing pipeline 400, or a portion thereof, is implemented in an image capture apparatus, such as the image capture apparatus 100 shown in FIGS. 1A-1B, the image capture apparatus 200 shown in FIGS. 2A-2C, the image capture apparatus 300 shown in FIG. 3, or another image capture apparatus. In some implementations, the image processing pipeline 400 may be implemented in a digital signal processor (DSP), an application-specific integrated circuit (ASIC), or a combination of a digital signal processor and an application-specific integrated circuit. One or more components of the pipeline 400 may be implemented in hardware, software, or a combination of hardware and software.

As shown in FIG. 4, the image processing pipeline 400 includes an image sensor 410, an image signal processor (ISP) 420, and an encoder 430. The encoder 430 is shown with a broken line border to indicate that the encoder may be omitted, or absent, from the image processing pipeline 400. In some implementations, the encoder 430 may be included in another device. In implementations that include the encoder 430, the image processing pipeline 400 may be an image processing and coding pipeline. The image processing pipeline 400 may include components other than the components shown in FIG. 4.

The image sensor 410 receives input 440, such as photons incident on the image sensor 410. The image sensor 410 captures image data (source image data). Capturing source image data includes measuring or sensing the input 440, which may include counting, or otherwise measuring, photons incident on the image sensor 410, such as for a defined temporal duration or period (exposure). Capturing source image data includes converting the analog input 440 to a digital source image signal in a defined format, which may be referred to herein as "a raw image signal." For example, the raw image signal may be in a format such as RGB format, which may represent individual pixels using a combination of values or components, such as a red component (R), a green component (G), and a blue component (B). In another example, the raw image signal may be in a Bayer format, wherein a respective pixel may be one of a combination of adjacent pixels, such as a combination of four adjacent pixels, of a Bayer pattern.

Although one image sensor 410 is shown in FIG. 4, the image processing pipeline 400 may include two or more image sensors. In some implementations, an image, or frame, such as an image, or frame, included in the source image signal, may be one of a sequence or series of images or frames of a video, such as a sequence, or series, of frames captured at a rate, or frame rate, which may be a number or cardinality of frames captured per defined temporal period, such as twenty-four, thirty, sixty, or one-hundred twenty frames per second.

The image sensor 410 obtains image acquisition configuration data 450. The image acquisition configuration data 450 may include image cropping parameters, binning/skipping parameters, pixel rate parameters, bitrate parameters, resolution parameters, framerate parameters, or other image acquisition configuration data or combinations of image acquisition configuration data. Obtaining the image acquisition configuration data 450 may include receiving the image acquisition configuration data 450 from a source other than a component of the image processing pipeline 400. For example, the image acquisition configuration data 450, or a portion thereof, may be received from another component, such as a user interface component, of the image capture apparatus implementing the image processing pipeline 400, such as one or more of the user interface components 360 shown in FIG. 3. The image sensor 410 obtains, outputs, or both, the source image data in accordance with the image acquisition configuration data 450. For example, the image sensor 410 may obtain the image acquisition configuration data 450 prior to capturing the source image.

The image sensor 410 receives, or otherwise obtains or accesses, adaptive acquisition control data 460, such as auto exposure (AE) data, auto white balance (AWB) data, global tone mapping (GTM) data, Auto Color Lens Shading (ACLS) data, color correction data, or other adaptive acquisition control data or combination of adaptive acquisition control data. For example, the image sensor 410 receives the adaptive acquisition control data 460 from the image signal processor 420. The image sensor 410 obtains, outputs, or both, the source image data in accordance with the adaptive acquisition control data 460.

The image sensor 410 controls, such as configures, sets, or modifies, one or more image acquisition parameters or settings, or otherwise controls the operation of the image sensor 420, in accordance with the image acquisition configuration data 450 and the adaptive acquisition control data 460. For example, the image sensor 410 may capture a first source image using, or in accordance with, the image acquisition configuration data 450, and in the absence of adaptive acquisition control data 460 or using defined values for the adaptive acquisition control data 460, output the first source image to the image signal processor 420, obtain adaptive acquisition control data 460 generated using the first source image data from the image signal processor 420, and capture a second source image using, or in accordance with, the image acquisition configuration data 450 and the adaptive acquisition control data 460 generated using the first source image.

The image sensor 410 outputs source image data, which may include the source image signal, image acquisition data, or a combination thereof, to the image signal processor 420.

The image signal processor 420 receives, or otherwise accesses or obtains, the source image data from the image sensor 410. The image signal processor 420 processes the source image data to obtain input image data. In some implementations, the image signal processor 420 converts the raw image signal (RGB data) to another format, such as a format expressing individual pixels using a combination of values or components, such as a luminance, or luma, value (Y), a blue chrominance, or chroma, value (U or Cb), and a red chroma value (V or Cr), such as the YUV or YCbCr formats.

Processing the source image data includes generating the adaptive acquisition control data 460. The adaptive acquisition control data 460 includes data for controlling the acquisition of a one or more images by the image sensor 410.

The image signal processor 420 includes components not expressly shown in FIG. 4 for obtaining and processing the source image data. For example, the image signal processor 420 may include one or more sensor input (SEN) components (not shown), one or more sensor readout (SRO) components (not shown), one or more image data compression components, one or more image data decompression components, one or more internal memory, or data storage, components, one or more Bayer-to-Bayer (B2B) components, one or more local motion estimation (LME) components, one or more local motion compensation (LMC) components, one or more global motion compensation (GMC) components, one or more Bayer-to-RGB (B2R) components, one or more image processing units (IPU), one or more high dynamic range (HDR) components, one or more three-dimensional noise reduction (3DNR) components, one or more sharpening components, one or more raw-to-YUV (R2Y) components, one or more Chroma Noise Reduction (CNR) components, one or more local tone mapping (LTM) components, one or more YUV-to-YUV (Y2Y) components, one or more warp and blend components, one or more stitching cost components, one or more scaler components, or a configuration controller. The image signal processor 420, or respective components thereof, may be implemented in hardware, software, or a combination of hardware and software. Although one image signal processor 420 is shown in FIG. 4, the image processing pipeline 400 may include multiple image signal processors. In implementations that include multiple image signal processors, the functionality of the image signal processor 420 may be divided or distributed among the image signal processors.

In some implementations, the image signal processor 420 may implement or include multiple parallel, or partially parallel paths for image processing. For example, for high dynamic range image processing based on two source images, the image signal processor 420 may implement a first image processing path for a first source image and a second image processing path for a second source image, wherein the image processing paths may include components that are shared among the paths, such as memory components, and may include components that are separately included in each path, such as a first sensor readout component in the first image processing path and a second sensor readout component in the second image processing path, such that image processing by the respective paths may be performed in parallel, or partially in parallel.

The image signal processor 420, or one or more components thereof, such as the sensor input components, may perform black-point removal for the image data. In some implementations, the image sensor 410 may compress the source image data, or a portion thereof, and the image signal processor 420, or one or more components thereof, such as one or more of the sensor input components or one or more of the image data decompression components, may decompress the compressed source image data to obtain the source image data.

The image signal processor 420, or one or more components thereof, such as the sensor readout components, may perform dead pixel correction for the image data. The sensor readout component may perform scaling for the image data. The sensor readout component may obtain, such as generate or determine, adaptive acquisition control data, such as auto exposure data, auto white balance data, global tone mapping data, Auto Color Lens Shading data, or other adaptive acquisition control data, based on the source image data.

The image signal processor 420, or one or more components thereof, such as the image data compression components, may obtain the image data, or a portion thereof, such as from another component of the image signal processor 420, compress the image data, and output the compressed image data, such as to another component of the image signal processor 420, such as to a memory component of the image signal processor 420.

The image signal processor 420, or one or more components thereof, such as the image data decompression, or uncompression, components (UCX), may read, receive, or otherwise access, compressed image data and may decompress, or uncompress, the compressed image data to obtain image data. In some implementations, other components of the image signal processor 420 may request, such as send a request message or signal, the image data from an uncompression component, and, in response to the request, the uncompression component may obtain corresponding compressed image data, uncompress the compressed image data to obtain the requested image data, and output, such as send or otherwise make available, the requested image data to the component that requested the image data. The image signal processor 420 may include multiple uncompression components, which may be respectively optimized for uncompression with respect to one or more defined image data formats.

The image signal processor 420, or one or more components thereof, such as the internal memory, or data storage, components. The memory components store image data, such as compressed image data internally within the image signal processor 420 and are accessible to the image signal processor 420, or to components of the image signal processor 420. In some implementations, a memory component may be accessible, such as write accessible, to a defined component of the image signal processor 420, such as an image data compression component, and the memory component may be accessible, such as read accessible, to another defined component of the image signal processor 420, such as an uncompression component of the image signal processor 420.

The image signal processor 420, or one or more components thereof, such as the Bayer-to-Bayer components, which may process image data, such as to transform or convert the image data from a first Bayer format, such as a signed 15-bit Bayer format data, to second Bayer format, such as an unsigned 14-bit Bayer format. The Bayer-to-Bayer components may obtain, such as generate or determine, high dynamic range Tone Control data based on the current image data.

Although not expressly shown in FIG. 4, in some implementations, a respective Bayer-to-Bayer component may include one or more sub-components. For example, the Bayer-to-Bayer component may include one or more gain components. In another example, the Bayer-to-Bayer component may include one or more offset map components, which may respectively apply respective offset maps to the image data. The respective offset maps may have a configurable size, which may have a maximum size, such as 129×129. The respective offset maps may have a non-uniform grid. Applying the offset map may include saturation management, which may preserve saturated areas on respective images based on R, G, and B values. The values of the offset map may be modified per-frame and double buffering may be used for the map values. A respective offset map component may, such as prior to Bayer noise removal (denoising), compensate for non-uniform blackpoint removal, such as due to non-uniform thermal heating of the sensor or image capture device. A respective offset map component may, such as subsequent to Bayer noise removal, compensate for flare, such as flare on hemispherical lenses, and/or may perform local contrast enhancement, such a dehazing or local tone mapping.

In another example, the Bayer-to-Bayer component may include a Bayer Noise Reduction (Bayer NR) component, which may convert image data, such as from a first format, such as a signed 15-bit Bayer format, to a second format, such as an unsigned 14-bit Bayer format. In another example, the Bayer-to-Bayer component may include one or more lens shading (FSHD) component, which may, respectively, perform lens shading correction, such as luminance lens shading correction, color lens shading correction, or both. In some implementations, a respective lens shading component may perform exposure compensation between two or more sensors of a multi-sensor image capture apparatus, such as between two hemispherical lenses. In some implementations, a respective lens shading component may apply map-based gains, radial model gain, or a combination, such as a multiplicative combination, thereof. In some implementations, a respective lens shading component may perform saturation management, which may preserve saturated areas on respective images. Map and lookup table values for a respective lens shading component may be configured or modified on a per-frame basis and double buffering may be used.

In another example, the Bayer-to-Bayer component may include a PZSFT component. In another example, the Bayer-to-Bayer component may include a half-RGB (½ RGB) component. In another example, the Bayer-to-Bayer component may include a color correction (CC) component, which may obtain subsampled data for local tone mapping, which may be used, for example, for applying an unsharp mask. In another example, the Bayer-to-Bayer component may include a Tone Control (TC) component, which may obtain subsampled data for local tone mapping, which may be used, for example, for applying an unsharp mask. In another example, the Bayer-to-Bayer component may include a Gamma (GM) component, which may apply a lookup-table independently per channel for color rendering (gamma curve application). Using a lookup-table, which may be an array, may reduce resource utilization, such as processor utilization, using an array indexing operation rather than more complex computation. The gamma component may obtain subsampled data for local tone mapping, which may be used, for example, for applying an unsharp mask.

In another example, the Bayer-to-Bayer component may include an RGB binning (RGB BIN) component, which may include a configurable binning factor, such as a binning factor configurable in the range from four to sixteen, such as four, eight, or sixteen. One or more sub-components of the Bayer-to-Bayer component, such as the RGB Binning component and the half-RGB component, may operate in parallel. The RGB binning component may output image data, such as to an external memory, which may include compressing the image data. The output of the RGB binning component may be a binned image, which may include low-resolution image data or low-resolution image map data. The output of the RGB binning component may be used to extract statistics for combing images, such as combining hemispherical images. The output of the RGB binning component may be used to estimate flare on one or more lenses, such as hemispherical lenses. The RGB binning component may obtain G channel values for the binned image by averaging Gr channel values and Gb channel values. The RGB binning component may obtain one or more portions of or values for the binned image by averaging pixel values in spatial areas identified based on the binning factor. In another example, the Bayer-to-Bayer component may include, such as for spherical image processing, an RGB-to-YUV component, which may obtain tone mapping statistics, such as histogram data and thumbnail data, using a weight map, which may weight respective regions of interest prior to statistics aggregation.

The image signal processor 420, or one or more components thereof, such as the local motion estimation components, which may generate local motion estimation data for use in image signal processing and encoding, such as in correcting distortion, stitching, and/or motion compensation. For example, the local motion estimation components may partition an image into blocks, arbitrarily shaped patches, individual pixels, or a combination thereof. The local motion estimation components may compare pixel values between frames, such as successive images, to determine displacement, or movement, between frames, which may be expressed as motion vectors (local motion vectors).

The image signal processor 420, or one or more components thereof, such as the local motion compensation components, which may obtain local motion data, such as local motion vectors, and may spatially apply the local motion data to an image to obtain a local motion compensated image or frame and may output the local motion compensated image or frame to one or more other components of the image signal processor 420.

The image signal processor 420, or one or more components thereof, such as the global motion compensation components, may receive, or otherwise access, global motion data, such as global motion data from a gyroscopic unit of the image capture apparatus, such as the gyroscope 346 shown in FIG. 3, corresponding to the current frame. The global motion compensation component may apply the global motion data to a current image to obtain a global motion compensated image, which the global motion compensation component may output, or otherwise make available, to one or more other components of the image signal processor 420

The image signal processor 420, or one or more components thereof, such as the Bayer-to-RGB components, which convert the image data from Bayer format to an RGB format. The Bayer-to-RGB components may implement white balancing and demosaicing. The Bayer-to-RGB components respectively output, or otherwise make available, RGB format image data to one or more other components of the image signal processor 420.

The image signal processor 420, or one or more components thereof, such as the image processing units, which perform warping, image registration, electronic image stabilization, motion detection, object detection, or the like. The image processing units respectively output, or otherwise make available, processed, or partially processed, image data to one or more other components of the image signal processor 420.

The image signal processor 420, or one or more components thereof, such as the high dynamic range components, may, respectively, generate high dynamic range images based on the current input image, the corresponding local motion compensated frame, the corresponding global motion compensated frame, or a combination thereof. The high dynamic range components respectively output, or otherwise make available, high dynamic range images to one or more other components of the image signal processor 420.

The high dynamic range components of the image signal processor 420 may, respectively, include one or more high dynamic range core components, one or more tone control (TC) components, or one or more high dynamic range core components and one or more tone control components. For example, the image signal processor 420 may include a high dynamic range component that includes a high dynamic range core component and a tone control component. The high dynamic range core component may obtain, or generate, combined image data, such as a high dynamic range image, by merging, fusing, or combining the image data, such as unsigned 14-bit RGB format image data, for multiple, such as two, images (HDR fusion) to obtain, and output, the high dynamic range image, such as in an unsigned 23-bit RGB format (full dynamic data). The high dynamic range core component may output the combined image data to the Tone Control component, or to other components of the image signal processor 420. The Tone Control component may compress the combined image data, such as from the unsigned 23-bit RGB format data to an unsigned 17-bit RGB format (enhanced dynamic data).

The image signal processor 420, or one or more components thereof, such as the three-dimensional noise reduction components reduce image noise for a frame based on one or more previously processed frames and output, or otherwise make available, noise reduced images to one or more other components of the image signal processor 420. In some implementations, the three-dimensional noise reduction component may be omitted or may be replaced by one or more lower-dimensional noise reduction components, such as by a spatial noise reduction component. The three-dimensional noise reduction components of the image signal processor 420 may, respectively, include one or more temporal noise reduction (TNR) components, one or more raw-to-raw (R2R) components, or one or more temporal noise reduction components and one or more raw-to-raw components. For example, the image signal processor 420 may include a three-dimensional noise reduction component that includes a temporal noise reduction component and a raw-to-raw component.

The image signal processor 420, or one or more components thereof, such as the sharpening components, obtains sharpened image data based on the image data, such as based on noise reduced image data, which may recover image detail, such as detail reduced by temporal denoising or warping. The sharpening components respectively output, or otherwise make available, sharpened image data to one or more other components of the image signal processor 420.

The image signal processor 420, or one or more components thereof, such as the raw-to-YUV components, may transform, or convert, image data, such as from the raw image format to another image format, such as the YUV format, which includes a combination of a luminance (Y) component and two chrominance (UV) components. The raw-to-YUV components may, respectively, demosaic, color process, or a both, images.

Although not expressly shown in FIG. 4, in some implementations, a respective raw-to-YUV component may include one or more sub-components. For example, the raw-to-YUV component may include a white balance (WB) component, which performs white balance correction on the image data. In another example, a respective raw-to-YUV component may include one or more color correction components (CC0, CC1), which may implement linear color rendering, which may include applying a 3×3 color matrix. For example, the raw-to-YUV component may include a first color correction component (CC0) and a second color correction component (CC1). In another example, a respective raw-to-YUV component may include a three-dimensional lookup table component, such as subsequent to a first color correction component. Although not expressly shown in FIG. 4, in some implementations, a respective raw-to-YUV component may include a Multi-Axis Color Correction (MCC) component, such as subsequent to a three-dimensional lookup table component, which may implement non-linear color rendering, such as in Hue, Saturation, Value (HSV) space.

In another example, a respective raw-to-YUV component may include a blackpoint RGB removal (BPRGB) component, which may process image data, such as low intensity values, such as values within a defined intensity threshold, such as less than or equal to, 28, to obtain histogram data wherein values exceeding a defined intensity threshold may be omitted, or excluded, from the histogram data processing. In another example, a respective raw-to-YUV component may include a Multiple Tone Control (Multi-TC) component, which may convert image data, such as unsigned 17-bit RGB image data, to another format, such as unsigned 14-bit RGB image data. The Multiple Tone Control component may apply dynamic tone mapping to the Y channel (luminance) data, which may be based on, for example, image capture conditions, such as light conditions or scene conditions. The tone mapping may include local tone mapping, global tone mapping, or a combination thereof.

In another example, a respective raw-to-YUV component may include a Gamma (GM) component, which may convert image data, such as unsigned 14-bit RGB image data, to another format, such as unsigned 10-bit RGB image data. The Gamma component may apply a lookup-table independently per channel for color rendering (gamma curve application). Using a lookup-table, which may be an array, may reduce resource utilization, such as processor utilization, using an array indexing operation rather than more complex computation. In another example, a respective raw-to-YUV component may include a three-dimensional lookup table (3DLUT) component, which may include, or may be, a three-dimensional lookup table, which may map RGB input values to RGB output values through a non-linear function for non-linear color rendering. In another example, a respective raw-to-YUV component may include a Multi-Axis Color Correction (MCC) component, which may implement non-linear color rendering. For example, the multi-axis color correction component may perform color non-linear rendering, such as in Hue, Saturation, Value (HSV) space.

The image signal processor 420, or one or more components thereof, such as the Chroma Noise Reduction (CNR) components, may perform chroma denoising, luma denoising, or both.

The image signal processor 420, or one or more components thereof, such as the local tone mapping components, may perform multi-scale local tone mapping using a single pass approach or a multi-pass approach on a frame at different scales. The as the local tone mapping components may, respectively, enhance detail and may omit introducing artifacts. For example, the Local Tone Mapping components may, respectively, apply tone mapping, which may be similar to applying an unsharp-mask. Processing an image by the local tone mapping components may include obtaining, processing, such as in response to gamma correction, tone control, or both, and using a low-resolution map for local tone mapping.

The image signal processor 420, or one or more components thereof, such as the YUV-to-YUV (Y2Y) components, may perform local tone mapping of YUV images. In some implementations, the YUV-to-YUV components may include multi-scale local tone mapping using a single pass approach or a multi-pass approach on a frame at different scales.

The image signal processor 420, or one or more components thereof, such as the warp and blend components, may warp images, blend images, or both. In some implementations, the warp and blend components may warp a corona around the equator of a respective frame to a rectangle. For example, the warp and blend components may warp a corona around the equator of a respective frame to a rectangle based on the corresponding low-resolution frame. The warp and blend components, may, respectively, apply one or more transformations to the frames, such as to correct for distortions at image edges, which may be subject to a close to identity constraint.

The image signal processor 420, or one or more components thereof, such as the stitching cost components, may generate a stitching cost map, which may be represented as a rectangle having disparity (x) and longitude (y) based on a warping. Respective values of the stitching cost map may be a cost function of a disparity (x) value for a corresponding longitude. Stitching cost maps may be generated for various scales, longitudes, and disparities.

The image signal processor 420, or one or more components thereof, such as the scaler components, may scale images, such as in patches, or blocks, of pixels, such as 16×16 blocks, 8×8 blocks, or patches or blocks of any other size or combination of sizes.

The image signal processor 420, or one or more components thereof, such as the configuration controller, may control the operation of the image signal processor 420, or the components thereof.

The image signal processor 420 outputs processed image data, such as by storing the processed image data in a memory of the image capture apparatus, such as external to the image signal processor 420, or by sending, or otherwise making available, the processed image data to another component of the image processing pipeline 400, such as the encoder 430, or to another component of the image capture apparatus.

The encoder 430 encodes or compresses the output of the image signal processor 420. In some implementations, the encoder 430 implements one or more encoding standards, which may include motion estimation. The encoder 430 outputs the encoded processed image to an output 470. In an embodiment that does not include the encoder 430, the image signal processor 420 outputs the processed image to the output 470. The output 470 may include, for example, a display, such as a display of the image capture apparatus, such as one or more of the displays 108, 140 shown in FIG. 1, the display 224 shown in FIG. 2, or the display 362.4 shown in FIG. 3, to a storage device, or both. The output 470 is a signal, such as to an external device.

Figure 5:
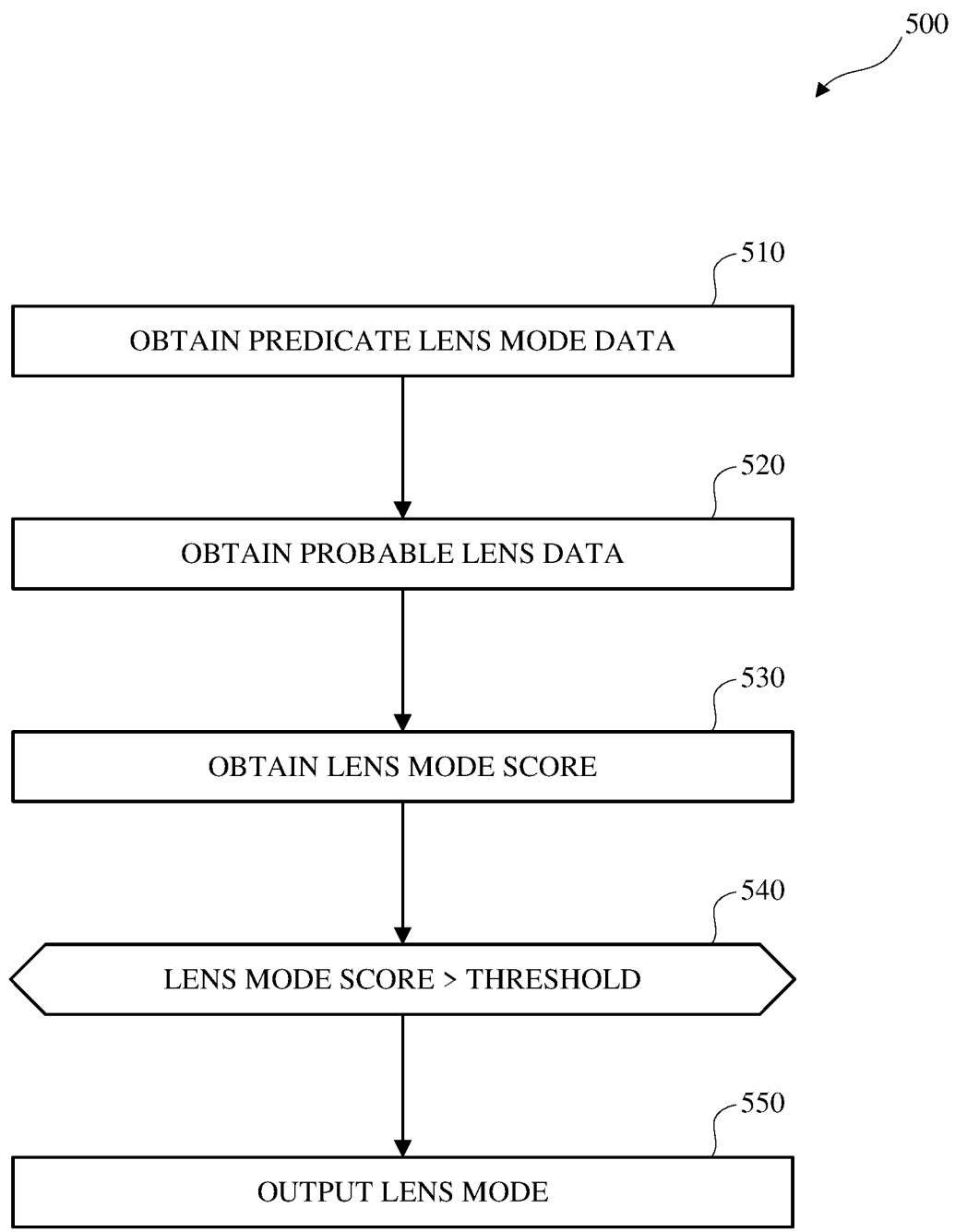
FIG. 5 is a flow diagram of an example of lens mode configuration using lens mode auto-detection.

FIG. 5 is a flow diagram of an example of lens mode configuration 500 using lens mode auto-detection. The methods and techniques of lens mode configuration 500 described herein, or aspects thereof, may be implemented by an image capture apparatus, or one or more components thereof, such as the image capture apparatus 100 shown in FIGS. 1A-1B, the image capture apparatus 200 shown in FIGS. 2A-2C, or the image capture apparatus 300 shown in FIG. 3. The methods and techniques of lens mode configuration 500 described herein, or aspects thereof, may be implemented by an image capture device, such as the image capture device 104 shown in FIGS. 1A-1B, one or more of the image capture devices 204, 206 shown in FIGS. 2A-2C, an image capture device of the image capture apparatus 300 shown in FIG. 3. The methods and techniques of lens mode configuration 500 described herein, or aspects thereof, may be implemented by an image processing pipeline, or one or more components thereof, such as the image processing pipeline 400 shown in FIG. 4.

Lens mode configuration 500 includes obtaining predicate lens mode data at 510, obtaining probable lens data at 520, obtaining a lens mode score at 530, determining whether the lens mode score is greater than a threshold at 540, and outputting lens mode configuration data at 550.

Predicate lens mode data is obtained at 510. The predicate lens mode data may be obtained by reading, or otherwise accessing, previously stored data from a memory, of the image capture apparatus. The predicate lens mode data may include a confidence index, which may be a predicate lens mode score (changeMode$_{t-1}$) indicating a lens mode score output, such as stored in the memory of the image capture apparatus, by a previous, such as immediately previous, iteration, or performance, of lens mode configuration 500. In some implementations, the previously stored predicate lens mode data may be manually configured, stored, or both, data. In some implementations, the respective predicate lens mode scores generated, or output, by a defined cardinality, or number, (N), such as thirty (30), of previous iterations of lens mode configuration 500 may be stored in the memory of the image capture apparatus, or may be otherwise available to the current iteration or performance of lens mode configuration 500, and one or more of the previously stored respective predicate lens mode scores may be used, such as aggregated or summarized, to obtain the confidence index. The defined cardinality, or number, (N) of previous predicate lens mode scores used may be configurable.

Figure 6:
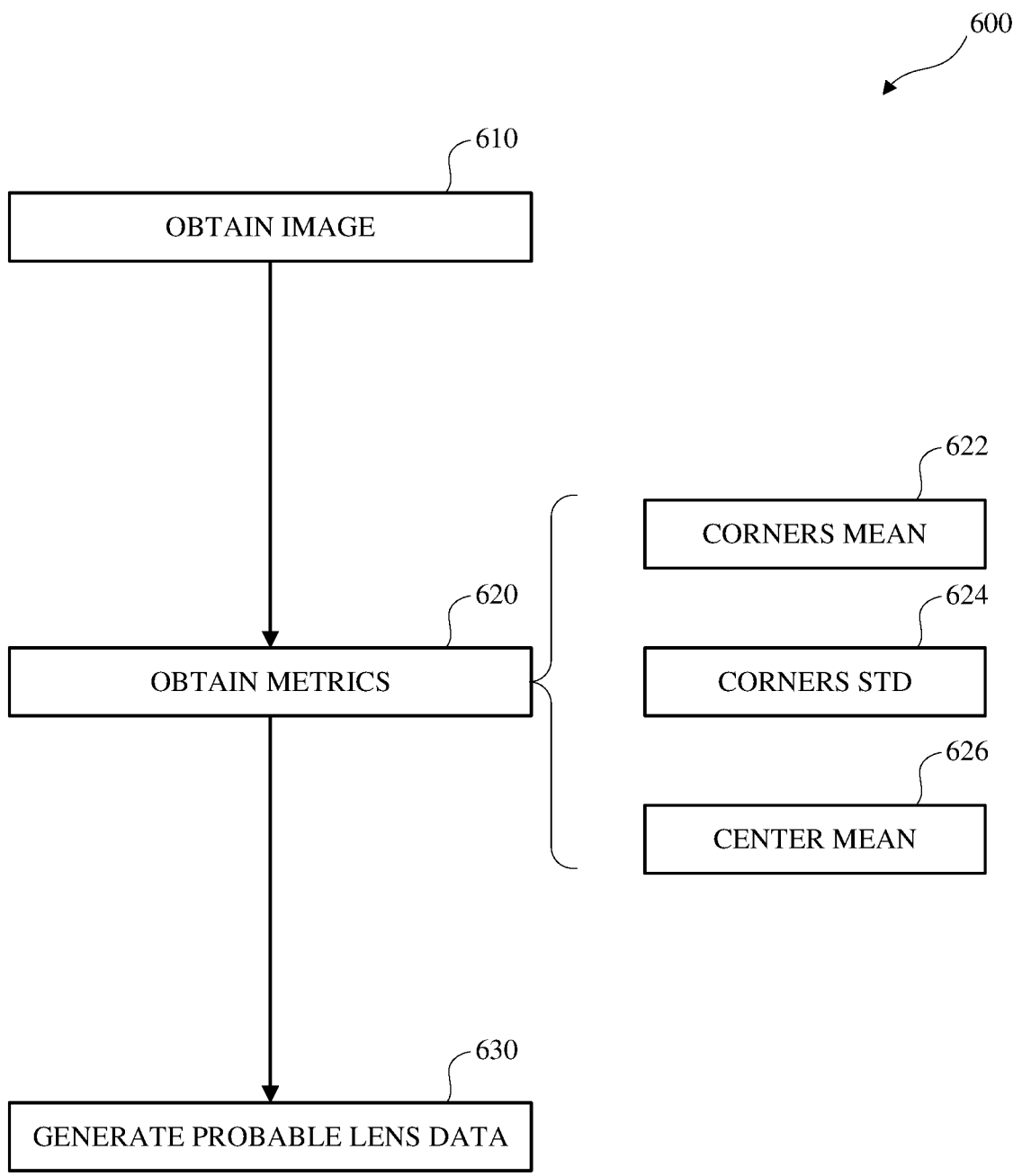
FIG. 6 is a flow diagram of an example of lens mode auto-detection.

Probable lens data is obtained at 520. The probable lens data may include a value (AltLensOn), such as a Boolean value, indicating a prediction, estimate, or calculation, as to whether the alternate lens is in use, or is on, such as operatively connected to, the image capture apparatus. For example, the value (AltLensOn) may be a Boolean value corresponding to truth, such as one (1), indicating a determination, prediction, or estimation, that the alternate lens is in use on the image capture apparatus, such that contemporaneously captured images captured by the image capture apparatus are obtained using the alternate lens, or the value (AltLensOn) may be a Boolean value corresponding to falsehood, such as zero (0), indicating a determination, prediction, or estimation, that a lens other than the alternate lens, such as the primary lens, is in use on the image capture apparatus, such that contemporaneously captured images captured by the image capture apparatus are obtained using a lens other than the alternate lens, such as the primary lens. An example of obtaining the probable lens data is shown in FIG. 6. In some implementations, the probable lens data may include multiple values, respectively indicating a determination, prediction, or estimation, whether a respective lens is in use. In some implementations, the probable lens data may include an integer or floating-point value, wherein respective values thereof indicate a determination, prediction, or estimation that a corresponding lens is in use.

A lens mode score (changeMode$_t$) is obtained at 530. The lens mode score (changeMode$_t$) may be a smoothed score indicating whether the current lens mode is consistent with the current lens. For example, the current lens may be the primary lens, the current lens mode may be the primary lens mode, and the lens mode score (changeMode$_t$) may be zero (0), indicating that the current lens mode is consistent with the current lens. In another example, the current lens may be the alternate lens, the current lens mode may be the alternate lens mode, and the lens mode score (changeMode$_t$) may be zero (0), indicating that the current lens mode is consistent with the current lens. In another example, the current lens may be the primary lens, the current lens mode may be the alternate lens mode, and the lens mode score (changeMode$_t$) may be one (1), indicating that the current lens mode is inconsistent with the current lens. In another example, the current lens may be the alternate lens, the current lens mode may be the primary lens mode, and the lens mode score (changeMode$_t$) may be one (1), indicating that the current lens mode is inconsistent with the current lens. The lens mode score (changeMode$_t$) may be a value, such as a Boolean value, or a floating-point value in the range from zero (0) to one (1), inclusive.

Obtaining the lens mode score (changeMode$_t$) may include obtaining a lens mode error value (errMode). The lens mode error value (errMode) may be a Boolean value, such as one (1) indicating that the currently configured lens mode is determined to be inconsistent, or mismatched, with the prediction of the current operative lens or zero (0) indicating that the currently configured lens mode is determined to be consistent, or matched, with the prediction of the current operative lens. The lens mode error value (errMode) may be obtained, determined, or calculated, using the probable lens data (AltLensOn) obtained at 520, a primary lens mode value (primaryMode) indicating whether the currently configured lens mode is the primary lens mode, which may be a Boolean value, such as one (1) indicating that the currently configured lens mode is the primary lens mode or zero (0) indicating that the currently configured lens mode is other than the primary lens mode, and an alternate lens mode value (altMode) indicating whether the currently configured lens mode is the alternate lens mode, which may be a Boolean value, such as one (1) indicating that the currently configured lens mode is the alternate lens mode or zero (0) indicating that the currently configured lens mode is other than the alternate lens mode, such as by obtaining a result of a logical disjunction ("OR", "||"), which may be a Boolean operation, of a result of a logical conjunction ("AND", "&&"), which may be a Boolean operation, of the probable lens data and the primary lens mode value, and a result of a logical conjunction ("AND", "&&"), which may be a Boolean operation, of a negative (!) of the probable lens data and the alternate lens mode value, which may be expressed as the following:

$$\text{errMode} = (\text{AltLensOn \&\& primaryMode}) || (! \text{AltLensOn \&\& altMode}). \quad \text{[Equation 1]}$$

For example, the currently configured lens mode may be the primary lens mode, such that the primary lens mode value (primaryMode) is one (1 or TRUE) and the alternate lens mode value (altMode) is zero (0 or FALSE), and the probable lens data (AltLensOn) may have a value, such as one (1), representing truth, and indicating a determination, prediction, or estimation that the alternate lens is in use. A result (primary result) of the logical, or Boolean, conjunction ("AND" or "&&") of the probable lens data (AltLensOn) and the primary lens mode value (primaryMode) is a Boolean value, such as one (1), indicating truth. A result (alternate result) of the logical, or Boolean, conjunction of the negative (!) of the probable lens data (AltLensOn), which is a Boolean value, such as zero (0), and the alternate lens mode value (altMode), is a Boolean value, such as zero (0), indicating falsehood. The logical, or Boolean, disjunction ("OR" or "||") of the primary result (AltLensOn && primaryMode) and the alternate result (! AltLensOn && altMode) may be a value, such as Boolean value, such as one (1), indicating truth, indicating that there is an error, or mismatch, between the predicted lens and the currently configured lens mode.

In another example, the currently configured lens mode may be the alternate lens mode, such that the primary lens mode value (primaryMode) is zero (0 or FALSE) and the alternate lens mode value (altMode) is one (1 or TRUE), and the probable lens data (AltLensOn) may have a value, such as one (1), representing truth, and indicating a determination, prediction, or estimation that the alternate lens is in use. A result (primary result) of the logical, or Boolean, conjunction ("AND" or "&&") of the probable lens data (AltLensOn) and the primary lens mode value (primaryMode) is a Boolean value, such as zero (0), indicating falsehood. A result (alternate result) of the logical, or Boolean, conjunction of the negative (!) of the probable lens data (AltLensOn), which is a Boolean value, such as zero (0), and the alternate lens mode value (altMode), is a Boolean value, such as zero (0), indicating falsehood. The logical, or Boolean, disjunction ("OR" or "||") of the primary result (AltLensOn && primaryMode) and the alternate result (! AltLensOn && altMode) may be a value, such as Boolean value, such as zero (0), indicating falsehood, indicating that the absence of error, or mismatch, between the predicted lens and the currently configured lens mode.

In another example, the currently configured lens mode may be the primary lens mode, such that the primary lens mode value (primaryMode) is one (1 or TRUE) and the alternate lens mode value (altMode) is zero (0 or FALSE), and the probable lens data (AltLensOn) may have a value, such as zero (0), representing falsehood, and indicating a determination, prediction, or estimation that the primary lens is in use. A result (primary result) of the logical, or Boolean, conjunction ("AND" or "&&") of the probable lens data (AltLensOn) and the primary lens mode value (primaryMode) is a Boolean value, such as zero (0), indicating falsehood. A result (alternate result) of the logical, or Boolean, conjunction of the negative (!) of the probable lens data (AltLensOn), which is a Boolean value, such as zero (0), and the alternate lens mode value (altMode), is a Boolean value, such as zero (0), indicating falsehood. The logical, or Boolean, disjunction ("OR" or "||") of the primary result (AltLensOn && primaryMode) and the alternate result (! AltLensOn && altMode) may be a value, such as Boolean value, such as zero (0), indicating falsehood, indicating that there is an absence of an error, or mismatch, between the predicted lens and the currently configured lens mode.

In another example, the currently configured lens mode may be the alternate lens mode, such that the primary lens mode value (primaryMode) is zero (0 or FALSE) and the alternate lens mode value (altMode) is one (1 or TRUE), and the probable lens data (AltLensOn) may have a value, such as zero (0), representing falsehood, and indicating a determination, prediction, or estimation that the primary lens is in use. A result (primary result) of the logical, or Boolean, conjunction ("AND" or "&&") of the probable lens data (AltLensOn) and the primary lens mode value (primaryMode) is a Boolean value, such as zero (0), indicating falsehood. A result (alternate result) of the logical, or Boolean, conjunction of the negative (!) of the probable lens data (AltLensOn), which is a Boolean value, such as zero (0), and the alternate lens mode value (altMode), is a Boolean value, such as one (1), indicating truth. The logical, or Boolean, disjunction ("OR" or "||") of the primary result (AltLensOn && primaryMode) and the alternate result (! AltLensOn && altMode) may be a value, such as Boolean value, such as one (1), indicating truth, indicating that there is an error, or mismatch, between the predicted lens and the currently configured lens mode.

The lens mode score (changeMode$_t$) may be determined using the lens mode error value (errMode), a defined modifier value ($\alpha$), such as 0.95, the predicate lens mode score (changeMode$_{t-1}$), wherein the subscript (t) indicates the current temporal location and the subscript (t−1) indicates the prior temporal location corresponding to the predicate lens mode score, and which may be expressed as the following:

$$\text{changeMode}_t = \alpha * \text{changeMode}_{t-1} + (1-\alpha) * \text{errMode}. \quad \text{[Equation 2]}$$

Whether the lens mode score (changeMode$_t$) is greater than a lens mode change threshold is determined at 540. Determining whether the lens mode score (changeMode$_t$) is greater than the lens mode change threshold (thresholdChangeMode) may include determining that the lens mode score (changeMode$_t$) is greater than the lens mode change threshold (thresholdChangeMode), which may be expressed as the following:

$$\text{changeMode}_t > \text{thresholdChangeMode.}$$

Determining whether the lens mode score (changeMode$_t$) is greater than the lens mode change threshold (thresholdChangeMode) may include determining that the lens mode score (changeMode$_t$) is less than or equal to the lens mode change threshold (thresholdChangeMode), which may be expressed as the following:

$$\text{changeMode}_t \leq \text{thresholdChangeMode.}$$

The determination whether the lens mode score (changeMode$_t$) is greater than the lens mode change threshold (thresholdChangeMode) may include determining that the lens mode score (changeMode$_t$) is less than or equal to the lens mode change threshold (thresholdChangeMode) at 540 and outputting the lens mode configuration data at 550 may be omitted.

The determination whether the lens mode score (changeMode$_t$) is greater than the lens mode change threshold (thresholdChangeMode) may include determining that the lens mode score (changeMode$_t$) is greater than the lens mode change threshold (thresholdChangeMode) at 540 and lens mode configuration data may be output at 550.

In some implementations, outputting the lens mode configuration data may include obtaining data indicating a target lens mode (target lens mode data), which differs from the current lens mode. For example, the current lens mode may be the primary lens mode, corresponding to the primary lens, and the target lens mode data may indicate that the alternate lens mode, such as the fisheye lens mode, is the target lens mode.

In some implementations, outputting the lens mode configuration data may include outputting lens mode configuration user interface data indicating a request, or suggestion, to change, modify, or configure the current lens mode to the target lens mode, such as for presentation to a user of the image capture apparatus.

Outputting the lens mode configuration data may include storing, or configuring, the target lens mode as the current lens mode of the image capture apparatus. In some implementations, storing, or configuring, the target lens mode as the current lens mode of the image capture apparatus may be performed in response to obtaining data, such as in response to obtaining [not expressly shown] user input responsive to presenting the lens mode configuration user interface data and indicating approval of the request, or an instruction to change, modify, or configure the current lens mode to the target lens mode.

In some implementations, user input data may be obtained [not expressly shown] responsive to presenting the lens mode configuration user interface data and indicating denial of the request, or an instruction to omit changing, modifying, or configuring the current lens mode to the target lens mode, such that the current lens mode is retained, and image processing may be adjusted in accordance with the lens and lens mode mismatch to maximize the quality of the captured image or images. For example, changing image processing wherein the lens mode is retained may omit, or exclude, changing cropping and may include changing auto-exposure processing parameters, white balance processing parameters, contrast management processing parameters, and the like, or a combination thereof.

Lens mode configuration 500 may be performed periodically, in response to detecting an event, or both. For example, an iteration of lens mode configuration 500 may be performed in accordance with capturing an image, which may be an image captured automatically, such as a preview image, which may correspond with a defined periodicity, such as ten (10) times per second at thirty (30) frames per second.

Prior to the performance of an iteration of lens mode configuration 500, the image capture apparatus may be in one of four states, such as a first state wherein the primary lens is operatively coupled to the image capture apparatus and the image capture apparatus is configured to use the primary lens mode, a second state wherein the alternate lens is operatively coupled to the image capture apparatus and the image capture apparatus is configured to use the alternate lens mode, a third state wherein the primary lens is operatively coupled to the image capture apparatus and the image capture apparatus is configured to use the alternate lens mode, or a fourth state wherein the alternate lens is operatively coupled to the image capture apparatus and the image capture apparatus is configured to use the primary lens mode. Lens mode configuration 500 may detect the current state of the image capture apparatus, such as the third state or the fourth state, and may minimize false positive determinations, wherein a false positive includes incorrectly identifying the currently configured lens mode as mismatched with the currently operative lens, wherein the image capture apparatus is in the first state or the second state, and a false negative includes incorrectly omitting identifying the currently configured lens mode as mismatched with the currently operative lens, wherein the image capture apparatus is in the third state or the fourth state.

FIG. 6 is a flow diagram of an example of lens mode auto-detection 600. The methods and techniques of lens mode auto-detection 600 described herein, or aspects thereof, may be implemented by an image capture apparatus, or one or more components thereof, such as the image capture apparatus 100 shown in FIGS. 1A-1B, the image capture apparatus 200 shown in FIGS. 2A-2C, or the image capture apparatus 300 shown in FIG. 3. The methods and techniques of lens mode auto-detection 600 described herein, or aspects thereof, may be implemented by an image capture device, such as the image capture device 104 shown in FIGS. 1A-1B, one or more of the image capture devices 204, 206 shown in FIGS. 2A-2C, an image capture device of the image capture apparatus 300 shown in FIG. 3. The methods and techniques of lens mode auto-detection 600 described herein, or aspects thereof, may be implemented by an image processing pipeline, or one or more components thereof, such as the image processing pipeline 400 shown in FIG. 4. Lens mode auto-detection 600 may be similar to obtaining probable lens data as shown at 520 in FIG. 5, except as is described herein or as is otherwise clear from context.

Lens mode auto-detection 600 includes obtaining a current image at 610, obtaining lens mode detection metrics at 620, and generating probable lens data (AltLensOn) at 630.

The current image is obtained at 610. Obtaining the current image includes capturing an image (current input image or captured image) by the image capture apparatus using a currently operative lens and a currently configured lens mode. The image sensor may be rectangular. The lens, or the light directed by the lens, may form a circle, or ellipse, with respect to the plane of the image sensor.

The image capture apparatus may be configured such that, using the primary lens, a portion, or portions, of the image sensor that captures little, or no, light is minimized or eliminated. For example, the image capture apparatus may be configured such that the light that is directed by the primary lens forms a circle, or ellipse, at the plane corresponding to the image sensor that includes the rectangular image sensor. An example representing light directed by the primary lens forming a circle, or ellipse, at the plane corresponding to the image sensor, such that the rectangular image sensor included in the circle, is shown at 710 in FIG. 7.

The image capture apparatus may be configured such that, using the alternate, or fisheye, lens, the portion, or portions, of the image sensor that captures little, or no, light is relatively large compared to using the primary lens. For example, the image capture apparatus may be configured such that the light that is directed by the alternate, or fisheye, lens forms a circle, or ellipse, at the plane corresponding to the image sensor that is included, or substantially included, such as horizontally included, in the rectangular area of the image sensor, such that an image captured using the alternate lens includes a content portion, corresponding to captured, measured, or detected light, and one or more non-content portions, corresponding to little, or no, captured, measured, or detected light. An example showing a representation an image captured using the alternate, or fisheye lens is shown at 720 in FIG. 7.

Obtaining the current image may include obtaining a reduced (spatially reduced), or thumbnail, image, such as a 64×48 pixel RGB thumbnail image corresponding to the captured image, which may be, for example, a 3648×2736 pixel image, and using the thumbnail, or reduced, image as the current image for lens mode auto-detection 600. Other images, such as the captured image, may be used.

The thumbnail, or reduced, image may be a cropped image, such that a spatial portion of the captured image, such as proximate to one or more of the edges of the capture image are cropped, or omitted, from the thumbnail, or reduced, image. For example, the captured image may be cropped in accordance with the smallest rectangle, or square, that includes the circular, or elliptical, image content portion, horizontally, vertically, or both. Other image reduction, such as subsampling, may be used.

Figure 7:
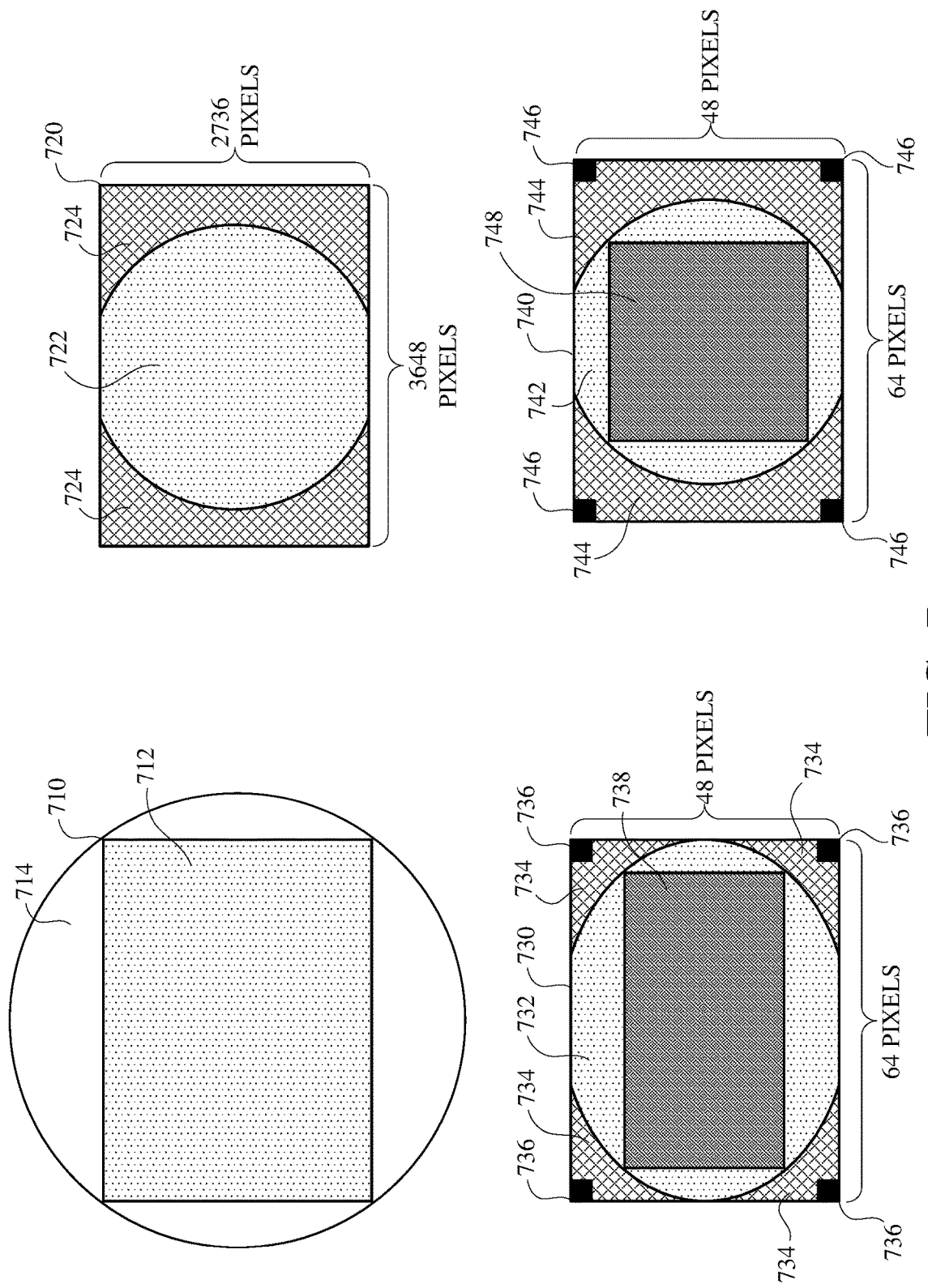
FIG. 7 shows examples of representations of images for lens mode auto-detection.

The portion of the captured image that is cropped to obtain the thumbnail image may correspond with the currently configured lens mode. For example, in the alternate lens mode, the relatively large non-content portions, such as the portions shown at 736, 746 in FIG. 7, are cropped, and in the primary lens mode, relatively little, or none, of the captured image is cropped. In some implementations, in the primary lens mode, cropping may be omitted.

One or more lens mode detection metrics are obtained at 620 by analyzing the current image. For example, the image capture apparatus may obtain, or determine, a corners mean metric at 622, a corners standard deviation metric at 624, a center mean metric at 626, or a combination thereof. Other metrics may be used.

Obtaining the lens mode detection metrics may include obtaining a corners mean at 622, such as using the green color channel of the reduced, or thumbnail, image as the current image. Obtaining the corners mean may include obtaining a respective corner mean, such as a mean of the green color channel, values (corner mean values) for respective square portions of the current image, corresponding to the respective corners of the current image, such as a mean of a square portion of the current image at the top-left corner of the current image (first corner mean value), a mean of a square portion of the current image at the top-right corner of the current image (second corner mean value), a mean of a square portion of the current image at the bottom-left corner of the current image (third corner mean value), and a mean of a square portion of the current image at the bottom-right corner of the current image (fourth corner mean value). For example, the respective squares may be 4×4 pixels. Other size and shape portions may be used. Examples showing images with the square portions in the corners indicated are shown at 730 and 740 in FIG. 7.

In some implementations, one or more of the corners of the current image may include pixel values corresponding to non-content image data, such as lens flare image data. The corners that include non-content image data, such as lens flare image data, may have relatively high corner mean values as compared to corners from which non-content image data, such as lens flare image data, is absent. Some of the corner mean values, such as the two smallest corner mean values, may be used and some of the corner mean values, such as the two highest corner mean values may be omitted, or excluded, from further use. The corner mean values that are used, such as the two lowest corner mean values, are averaged to obtain, or determine, an average corner mean value as the corners mean value (cornersMean).

In some implementations, obtaining the lens mode detection metrics may include obtaining a corners standard deviation (cornersStd) at 624, such as using the green color channel of the reduced, or thumbnail, image and using the square portion of the corners used to obtain the corners mean value (cornersMean) at 622, which may be the two corner portions respectively having the lowest (minimal magnitude) corner mean values. Obtaining the corners standard deviation (cornersStd), or variance, may include obtaining a respective corner standard deviation, such as a standard deviation of the green color channel values, for the respective square portions of the current image. The corner standard deviation values that are used are averaged to obtain, or determine, an average corner standard deviation value as the corners standard deviation value (cornersStd).

In some implementations, information from the current image, other than from the corners of the current image, may be used to generate, determine, or otherwise obtain, the probable lens data (AltLensOn). For example, the portions of the current image other than the corner portions may be relatively bright (high luminance), and the corner portions may be relatively dark (low luminance), which may indicate a high probability that the current image corresponds to an image captured using the alternate, or fisheye, lens. In another example, the portions of the current image other than the corner portions may be relatively dark (low luminance), and the corner portions may be relatively dark (low luminance), which may indicate a relatively low probability that the current image corresponds to an image captured using the alternate, or fisheye, lens.

Obtaining the lens mode detection metrics may include obtaining a center mean at 626, such as using the green color channel of the reduced, or thumbnail, image as the current image. The center mean value (centerMean) may be a mean of the pixel values, such as the green color channel values, of a rectangular portion (center portion) of the current image, at the center of the current image, within the elliptical image content portion. The center portion omits or excludes the corner portions. Obtaining the lens mode detection metrics may include obtaining a ratio (ratio) of the corners mean value (cornersMean) obtained at 622 and the center mean value (centerMean) may be determined, calculated, or otherwise obtained. Other portions of the image data may be used to determine, calculate, or otherwise obtain, the center mean value (centerMean). For example, a mean of a relatively small portion, such as a 4×4 pixel square, at the center of the current image may be used as the center mean value (centerMean). In another example, a mean may be determined along a curve corresponding to the edge or boarder of the elliptical, or circular, image content portion may be used as the center mean value (centerMean).

In some implementations, respective mean and standard deviation values may be determined, generated, or otherwise obtained, for the green color channel, the red color channel, and the blue color channel, respectively.

Probable lens data is generated, or otherwise obtained, at 630.

In some implementations, the probable lens data (AltLensOn) may be generated based on the average corners mean value (cornersMean), such as 0.3 percent of the image dynamic, and a corresponding defined average corners mean threshold (threshMean), such as based on a less than determination, which may be a Boolean operation, whether the average corners mean value (cornersMean) is less than the corresponding defined average corners mean threshold (threshMean), which may be expressed as the following:

$$\text{AltLensOn} = \text{cornersMean} < \text{threshMean}. \quad \text{[Equation 3]}$$

In some implementations, the probable lens data (AltLensOn) may be generated based on the average corners mean value (cornersMean), the corresponding defined average corners mean threshold (threshMean), the average corners standard deviation value (cornersStd), such as 0.2 percent, and a corresponding defined average corners standard deviation threshold (threshStd), such as based on a logical conjunction ("AND", "&&"), which may be a Boolean operation, of a less than determination (first less than determination), which may be a Boolean operation, whether the average corners mean value (cornersMean) is less than the corresponding defined average corners mean threshold (threshMean), and a less than determination (second less than determination), which may be a Boolean operation, whether the average corners standard deviation value (cornersStd) is less than the corresponding defined average corners standard deviation threshold (threshStd), which may be more robust than generating the probable lens data (AltLensOn) as shown in Equation 3, and which may be expressed as the following:

$$\text{AltLensOn} = \text{cornersMean} < \text{threshMean} \,\&\&\, \text{cornersStd} < \text{threshStd}. \quad \text{[Equation 4]}$$

In some implementations, the probable lens data (AltLensOn) may be generated based on the average corners mean value (cornersMean), the corresponding defined average corners mean threshold (threshMean), the average corners standard deviation value (cornersStd), a corresponding defined average corners standard deviation threshold (threshStd), the ratio (ratio) of the corners mean value (cornersMean) obtained at 622 and the center mean value (centerMean) obtained at 626, and a corresponding defined center mean threshold (threshRatio), such as based on a logical disjunction ("OR", "‖"), which may be a Boolean operation, of a result of a logical conjunction ("AND", "&&"), which may be a Boolean operation, of a less than determination, which may be a Boolean operation, whether the average corners mean value (cornersMean) is less than the corresponding defined average corners mean threshold (threshMean), and a less than determination (third less than determination), which may be a Boolean operation, whether the average corners standard deviation value (cornersStd) is less than the corresponding defined average corners standard deviation threshold (threshStd), and a less than determination, which may be a Boolean operation, whether the ratio (ratio) is less than the corresponding defined center mean threshold (threshRatio), such as 0.2, which may be more robust than generating the probable lens data (AltLensOn) as shown in Equation 4, and which may be expressed as the following:

$$\text{AltLensOn} = (\text{cornerMean} < \text{threshMean} \,\&\&\, \text{cornerStd} < \text{threshStd}) \| \text{ratio} < \text{threshRatio}. \quad \text{[Equation 5]}$$

A value of the probable lens data (AltLensOn) corresponding to truth, such as one (1), indicates a determination, prediction, or estimation, that the current image was generated from an image captured using the alternate lens. A value of the probable lens data (AltLensOn) corresponding to falsehood, such as zero (0), indicates a determination, prediction, or estimation, that the current image was generated from an image captured using the primary lens. In some implementations, one or more of the thresholds described herein, such as the defined average corners mean threshold (threshMean), may be defined in accordance with the currently operative lens mode. For example, the currently operative lens mode may be the primary lens mode and a relatively high value of the respective thresholds may be used such that the probability of detecting the alternate lens is relatively low, or the currently operative lens mode may be the alternate lens mode and a relatively low value of the respective thresholds may be used such that the probability of detecting the alternate lens is relatively high.

FIG. 7 shows examples of representations of images for lens mode auto-detection.

A representation of an image captured using the primary lens mode is shown at 710. The example shown at 710 includes a rectangular image content portion 712, shown with a stippled background to indicate image content, corresponding to the image content captured by the image sensor. The rectangular image content portion 712 is shown within a circle 714, with a white background, representing light directed by the operative, primary, lens outside the image sensor. For example, the rectangular image content portion 712 may correspond to a 3648×2736 pixel image.

A representation of an image captured using the alternate, or fisheye, lens is shown at 720. In the image representation shown at 720, an image content portion 722 is shown with a stippled background to indicate the portion of the image that includes image content, corresponding to substantial measured light, and other portions of the image 724 are shown with a cross-hatched background to indicate the portions of the captured image that omit image content and are substantially black, corresponding with little to no light measured or detected by the image sensor. For example, the image representation shown at 720 may correspond to a 3648×2736 pixel image.

A representation of a reduced, or thumbnail, image generated from an image captured using the alternate, or fisheye, lens in the alternate lens mode is shown at 730. The thumbnail image representation at 730 includes an image content portion 732, shown with a stippled background to indicate the portion of the image that includes image content, corresponding to substantial measured light, and other portions of the image 734 are shown with a cross-hatched background to indicate the portions of the captured image that omit image content and are substantially black, corresponding with little to no light measured or detected by the image sensor. Although described as substantially black and omitting image content, the other portions of the image 734 may include non-content image data, such as pixel values corresponding to image capture artifacts, such as lens flare.

Square portions 736, such as 4×4 pixel squares, are shown at the respective corners, which may be used for determining corner means, corner standard deviations, or both, as described herein. A rectangular center portion 738 is shown with a dark-stippled background, which may be used to determine the center means as described herein.

A representation of a reduced, or thumbnail, image generated from an image captured using the primary lens in the alternate lens mode is shown at 740. The thumbnail image representation at 740 includes an image content portion 742, shown with a stippled background to indicate the portion of the image that includes image content, corresponding to substantial measured light. The thumbnail image representation at 740 includes non-content portions 744 of the image, shown with a cross-hatched background to indicate the portions of the captured image that omit image content and are substantially black, corresponding with little to no light measured or detected by the image sensor. Although described as substantially black and omitting image content, the other portions of the image may include non-content image data, such as pixel values corresponding to image capture artifacts, such as lens flare. Square corner portions 746, such as 4×4 pixel squares, are shown at the respective corners, which may be used for determining corner means, corner standard deviations, or both, as described herein. A rectangular, or square, center portion 748, shown with a dark-stippled background, may be used to determine the center means as described herein.

While the disclosure has been described in connection with certain embodiments, it is to be understood that the disclosure is not to be limited to the disclosed embodiments but, on the contrary, is intended to cover various modifications and equivalent arrangements included within the scope of the appended claims, which scope is to be accorded the broadest interpretation so as to encompass all such modifications and equivalent structures as is permitted under the law.

What is claimed is:

1. A method comprising:
   performing lens mode auto-detection by an image capture apparatus, wherein lens mode auto-detection includes:
      obtaining predicate lens mode data;
      obtaining probable lens mode data, wherein obtaining the probable lens mode data includes:
         obtaining a current image, wherein obtaining the current image includes:
            obtaining a current input image from an image sensor of the image capture apparatus;
            obtaining a spatially reduced image representative of the current input image; and
            using the spatially reduced image as the current image;
         obtaining one or more lens mode detection metrics by analyzing the current image; and
         generating the probable lens mode data in accordance with the lens mode detection metrics;
      obtaining a lens mode score in accordance with the predicate lens mode data and the probable lens mode data;
      determining whether the lens mode score is greater than a defined lens mode change threshold; and
      in response to determining that the lens mode score breaches the defined lens mode change threshold, outputting lens mode data.

2. The method of claim 1, wherein:
   obtaining the current input image includes capturing the current input image using a currently operative lens and a currently configured lens mode;
   the currently configured lens mode is a primary lens mode or an alternate lens mode;
   the currently operative lens is a primary lens or an alternate lens;
   the primary lens is a lens other than a fisheye lens; and
   the alternate lens is a fisheye lens.

3. The method of claim 2, wherein:
   on a condition that the currently configured lens mode is the alternate lens mode, generating the spatially reduced image includes cropping in accordance with the alternate lens mode.

4. The method of claim 3, wherein obtaining the lens mode detection metrics includes:
   obtaining at least one of a corners mean value, a corners standard deviation value, or a center mean value.

5. The method of claim 4, wherein obtaining the corners mean value includes:
   obtaining corner mean values, wherein obtaining the corner mean values includes:
      obtaining a first corner mean value for a portion of the current image at the top-left corner of the current image;
      obtaining a second corner mean value for a portion of the current image at the top-right corner of the current image;
      obtaining a third corner mean value for a portion of the current image at the bottom-left corner of the current image; and
      obtaining a fourth corner mean value for a portion of the current image at the bottom-right corner of the current image;
   identifying a first minimal magnitude corner mean value from the corner mean values;
   identifying a second minimal magnitude corner mean value from the corner mean values, other than the first minimal magnitude corner mean value;
   obtaining, as the corners mean value, an average of the first minimal magnitude corner mean value and the second minimal magnitude corner mean value.

6. The method of claim 5, wherein obtaining the corners standard deviation value includes:
   obtaining a first standard deviation value of the first minimal magnitude corner mean value;
   obtaining a second standard deviation value of the second minimal magnitude corner mean value; and
   obtaining an average of the first standard deviation value and the second standard deviation value as the corners standard deviation value.

7. The method of claim 6, wherein obtaining the center mean value includes:
   obtaining, as the center mean value, a mean of a rectangular center portion of the current image, the center portion omitting portions of the current image corresponding to the corner mean values.

8. The method of claim 7, wherein obtaining the probable lens mode data includes:
   obtaining, as the probable lens mode data, a result of at least one of:
      a first less than determination whether the average corner mean value is less than a corresponding defined average corner mean threshold;
      a logical conjunction of the first less than determination and a second less than determination whether the average corners standard deviation value is less than the corresponding defined average corners standard deviation threshold; or
a logical disjunction of a result of the logical conjunction and a third less than determination whether a ratio of the corners mean value and the center mean value is less than a corresponding defined center mean threshold.

9. The method of claim 8, wherein obtaining the lens mode score includes:
obtaining a lens mode error value, wherein obtaining the lens mode error value includes obtaining, as the lens mode error value, a result of a logical disjunction of:
a result of a logical conjunction of the probable lens data and a primary lens mode value; and
a result of a logical conjunction of:
a negative of the probable lens data, and
an alternate lens mode value.

10. The method of claim 9, wherein obtaining the lens mode score includes:
obtaining, as the lens mode score, a result of a sum of:
a multiplication of a defined modifier value and a predicate lens mode score; and
a multiplication of:
a result of subtracting the defined modifier value from one; and
the lens mode error value.

11. An image capture apparatus comprising:
a currently operative lens, wherein the currently operative lens is a primary lens, which is a lens other than a fisheye lens, or an alternate lens, which is a fisheye lens;
an image sensor configured to capture, using the currently operative lens, a current input image, wherein, to obtain the current input image, the processor executes the instructions to obtain the current input image in accordance with a currently configured lens mode, wherein the currently configured lens mode is a primary lens mode or an alternate lens mode; and
a processor configured to execute instructions stored in a memory of the image capture apparatus to perform lens mode auto-detection, wherein to perform lens mode auto-detection the processor executes the instructions to:
obtain predicate lens mode data;
obtain probable lens mode data using the current input image, wherein to obtain the probable lens mode data, the processor executes the instructions to:
obtain, as a current image, a spatially reduced image representative of the current input image, wherein, on a condition that the currently configured lens mode is the alternate lens mode, to generate the spatially reduced image the processor executes the instructions to crop the current input image in accordance with the alternate lens mode;
obtain one or more lens mode detection metrics by analyzing the current image; and
generate the probable lens mode data in accordance with the lens mode detection metrics;
obtain a lens mode score in accordance with the predicate lens mode data and the probable lens mode data;
determine whether the lens mode score is greater than a defined lens mode change threshold; and
in response to a determination that the lens mode score breaches the defined lens mode change threshold, output, for presentation to a user of the image capture apparatus, lens mode data indicating that the currently operative lens and a currently configured lens mode are mismatched.

12. The apparatus of claim 11, wherein:
to obtain the lens mode detection metrics, the processor executes the instructions to:
obtain at least one of a corners mean value, a corners standard deviation value, or a center mean value.

13. The apparatus of claim 12, wherein to obtain the probable lens mode data, the processor executes the instructions to:
obtain, as the probable lens mode data, a result of at least one of:
a first less than determination whether the average corner mean value is less than a corresponding defined average corner mean threshold;
a logical conjunction of the first less than determination and a second less than determination whether the average corners standard deviation value is less than the corresponding defined average corners standard deviation threshold; or
a logical disjunction of a result of the logical conjunction and a third less than determination whether a ratio of the corners mean value and the center mean value is less than a corresponding defined center mean threshold.

14. The apparatus of claim 13, wherein to obtain the lens mode score, the processor executes the instructions to:
obtain a lens mode error value, wherein to obtain the lens mode error value the processor executes the instructions to obtain, as the lens mode error value, a result of a logical disjunction of:
a result of a logical conjunction of the probable lens data and a primary lens mode value; and
a result of a logical conjunction of:
a negative of the probable lens data, and
an alternate lens mode value.

15. The apparatus of claim 14, wherein to obtain the lens mode score, the processor executes the instructions to:
obtain, as the lens mode score, a result of a sum of:
a multiplication of a defined modifier value and a predicate lens mode score; and
a multiplication of:
a result of subtracting the defined modifier value from one; and
the lens mode error value.

16. A method comprising:
obtaining, from an image sensor of an image capture apparatus, using a currently operative lens, wherein the currently operative lens is a primary lens or an alternate lens, wherein the primary lens is a lens other than a fisheye lens and the alternate lens is a fisheye lens, of the image capture apparatus and in accordance with a currently configured lens mode, wherein the currently configured lens mode is a primary lens mode or an alternate lens mode, a current input image, wherein obtaining the current input image includes obtaining, as the current input image, a spatially reduced image representative of the current input image, wherein on a condition that the currently configured lens mode is the alternate lens mode, generating the spatially reduced image includes cropping in accordance with the alternate lens mode; and
in response to obtaining the current input image, performing lens mode auto-detection by the image capture apparatus, wherein lens mode auto-detection includes:
obtaining predicate lens mode data;

obtaining probable lens mode data, wherein obtaining the probable lens mode data includes obtaining one or more lens mode detection metrics by analyzing the current image, wherein obtaining the lens mode detection metrics includes:
  obtaining at least one of a corners mean value, a corners standard deviation value, or a center mean value;
  obtaining the probable lens mode data includes:
  obtaining one or more lens mode detection metrics by analyzing the current image; and
  generating the probable lens mode data in accordance with the lens mode detection metrics;
obtaining a lens mode score in accordance with the predicate lens mode data and the probable lens mode data;
determining whether the lens mode score is greater than a defined lens mode change threshold; and
in response to determining that the lens mode score breaches the defined lens mode change threshold, outputting for presentation to a user of the image capture apparatus, lens mode data indicating that the currently operative lens and the currently configured lens mode are mismatched.

17. The method of claim 10, wherein obtaining the predicate lens mode data includes obtaining the predicate lens mode score.

18. The method of claim 17, wherein obtaining the predicate lens mode score includes aggregating previously stored predicate lens mode scores.

19. The apparatus of claim 15, wherein to obtain the predicate lens mode data the processor executes the instructions to obtain the predicate lens mode score.

20. The method of claim 19, wherein to obtain the predicate lens mode score the processor executes the instructions to obtain an aggregation of previously stored predicate lens mode scores.

* * * * *